United States Patent
Li et al.

(10) Patent No.: US 11,185,988 B2
(45) Date of Patent: Nov. 30, 2021

(54) MOVEABLE ROBOT BLOCK DEPLOYED TO FORM A BARRIER AND SENSE ENVIRONMENTAL CONDITIONS

(71) Applicant: International Business Machines Corporation, Armonk, NY (US)

(72) Inventors: Luyao Li, Markham (CA); Ramesh Raj, Markham (CA); Kyle D. Robeson, North York (CA); Zhao Cheng, Markham (CA)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 16/191,830

(22) Filed: Nov. 15, 2018

(65) Prior Publication Data
US 2020/0156253 A1 May 21, 2020

(51) Int. Cl.
*G05B 15/00* (2006.01)
*G05B 19/00* (2006.01)
(Continued)

(52) U.S. Cl.
CPC .......... *B25J 9/1694* (2013.01); *B25J 9/0084* (2013.01); *B25J 9/1682* (2013.01); *B25J 11/002* (2013.01);
(Continued)

(58) Field of Classification Search
CPC ...... B25J 9/1694; B25J 11/002; B25J 9/1682; B25J 9/0084; B25J 9/1617; E06B 9/00; E06B 2009/005; E06B 2009/007
(Continued)

(56) References Cited

U.S. PATENT DOCUMENTS 6,150,738 A 11/2000 Yim
6,157,828 A 12/2000 Krishnamurthi
(Continued)

FOREIGN PATENT DOCUMENTS

CN 105666461 B 6/2016

OTHER PUBLICATIONS

Zhao et al. (Publication: ISS '17: Proceedings of the 2017 ACM International Conference on Interactive Surfaces and Spaces, Oct. 2017, pp. 82-91, https://doi.org/10.1145/3132272.3134143, "Robotic Assembly of Haptic Proxy Objects for Tangible Interaction and Virtual Reality" (Year: 2017).*
(Continued)

*Primary Examiner* — B M M Hannan
(74) *Attorney, Agent, or Firm* — Konrad, Raynes, Davda & Victor LLP; David W. Victor; Alan S. Raynes

(57) ABSTRACT

Provided are a computer program product, moveable robot block, and method for a moveable robot block deployed to form a barrier and sense environmental conditions. A command is received to couple to a location in a coordinate system comprising the barrier formed of a plurality of moveable robot blocks. Movement motors are controlled to cause the moveable robot block to move to the location in the coordinate system to couple to the barrier according to the command. An environmental sensor senses an environmental condition related to water sensed external to the moveable robot block when the moveable robot block is coupled to the barrier. The environmental condition is transmitted to the assembly management system over the network.

21 Claims, 14 Drawing Sheets

(51) Int. Cl.
    *B25J 9/00*     (2006.01)
    *B25J 9/16*     (2006.01)
    *E06B 9/00*     (2006.01)
    *B25J 11/00*    (2006.01)

(52) U.S. Cl.
    CPC .......... *E06B 9/00* (2013.01); *E06B 2009/005* (2013.01); *E06B 2009/007* (2013.01)

(58) Field of Classification Search
    USPC ...................................................... 700/258
    See application file for complete search history.

(56) References Cited

U.S. PATENT DOCUMENTS

| | | | |
|---|---|---|---|
| 9,202,184 | B2 | 12/2015 | Friedlander et al. |
| 10,035,259 | B1 | 7/2018 | Cheng et al. |
| 2002/0080038 | A1 | 6/2002 | Smith |
| 2005/0129463 | A1 | 6/2005 | Craig et al. |
| 2013/0123981 | A1* | 5/2013 | Lee .................... H04W 4/029 700/248 |
| 2018/0057264 | A1* | 3/2018 | Wicks ................ G06Q 10/087 |
| 2018/0272527 | A1 | 9/2018 | Cheng et al. |
| 2019/0226898 | A1* | 7/2019 | Gray, Jr. ............. H04W 84/18 |
| 2020/0142415 | A1* | 5/2020 | Oh ...................... G01V 11/00 |

OTHER PUBLICATIONS

Machine Translation for CN105666461B, published on Jun. 15, 2016, Total 10 pp.
Diep, F., "1,024 Robots Self-Assemble Into Any Shape You Want", [online], [Retrieved on Oct. 10, 2018]. Popular Science, Aug. 15, 2014, retrieved from the Internet at <URL: https://www.popsci.com/article/technology/1024-robots-self-assemble-any-shape-you-want>, Total 4 pp.
"Environment Agency reveals James Bond-Esque Flood-Tackling Gadgetry", [online], [Retrieved on Nov. 15, 2018]. Retrieved from the Internet at <URL: https://www.edie.net/news/4/Environment-Agency-reveals-James-Bond-style-UK-floods-gadgets/>, Nov. 13, 2015, Total 13 pp.
Hardesty, L., "Surprisingly Simple Scheme for Self-Assembling Robots", [online], [Retrieved on Nov. 15, 2018]. Retrieved from the Internet at <URL: http://news.mit.edu/2013/simple-scheme-for-self-assembling-robots-1004>, Oct. 4, 2013, Total 4 pp.
Okugawa, M., "Utilization of Robot Technology for Earthquake, Storm, and Flood Problems in the Tokai Region", Department of Mechanical Engineering, Faculaty of Engineering, Aichi Institute of Technology, acepted Jun. 10, 2014, Journal of Robotics and Mechatronics, vol. 26, No. 4, 2014, Total 6 pp.
Rubenstein, M. et al., "Programmable Self-assembly in a Thousand-robot Swarm", School of Engineering and Applied Sciences and Wyss Institute for Biologically Inspired Engineering, Harvard University, Cambridge, MA 02138, USA.Aug. 15, 2014 • vol. 345 Issue 6198, Total 6 pp.
Scholz, C. et al., "Rotating Robots Move Collectively and Self-organize", Nature Communications, DOI: 10.1038/s41467-018-03154-7, © The Author(s) 2018, Total 8 pp.
Tan, W., et al., "SambotII: A New Self-Assembly Modular Robot Platform Based on Sambot", School of Mechanical Engineering & Automation, BeiHang University, Beijing 100083, China, Accepted: Sep. 17, 2018; Published: Sep. 21, 2018, Total 20 pp.
Warncke, C., "Robots—The Future of Flood Fighting?", Feb. 28, 2014 [Retrieved on Jun. 16, 2018]. Retrieved from the Internet at <URL: https://hardyservices.co.uk/blog/robots-future-flood-fighting/>, Total 2 pp.
Williams, M., "Reconfigurable and Self-Assembling Robots—The Way of the Future", [online], [Retrieved on Oct. 12, 2018]. Retrieved from the Internet at <URL: https://www.herox.com/crowdsourcing-news/145-reconfigurable-and-self-assembling-robots-the-way>, Total 9 pp.
List of IBM Patents or Patent Applications Treated as Related, Nov. 15, 2018, Total 2 pp.
U.S. Patent Application with U.S. Appl. No. 16/191,814, filed Nov. 15, 2018, entitled "Controlling Moveable Robot Blocks to Dynamically Form a Barrier", invented by L. Li et al., Total 48 pp. [57.428 (Appln)].
Office Action 1 for U.S. Appl. No. 16/191,814, dated Feb. 1, 2021, 40 pp. [57.428 (OA1).
Response to Office Action 1 for U.S. Appl. No. 16/191,814, dated May 3, 2021, 20 pp. [57.428 (ROA1).
Grob, R., et al., "Autonomous Self-Assembly in Swarm-Bots", IEEE Transactions on Robotics, vol. 22, No. 6, Dec. 2006, 16 pp.
Murata, S., et al., "M-TRAN: Self-Reconfigurable Modular Robotic System", IEEE/ASME Transactions on Mechatronics, vol. 7, No. 4, Dec. 2002, 11 pp.
Sandbag Store LLC, "How to Build a Sandbag Wall", Revision 2, Apr. 15, 2014, 5 pp.
Tolley, M.T., et al., "Stochastic Modular Robotic Systems: A Study of Fluidic Assembly Strategies", IEEE Transactions on Robotics, vol. 26, No. 3, Jun. 2010, 13 pp.
Notice of Allowance 1 for U.S. Appl. No. 16/191,814, 16 pp., dated Jul. 14, 2021.

\* cited by examiner

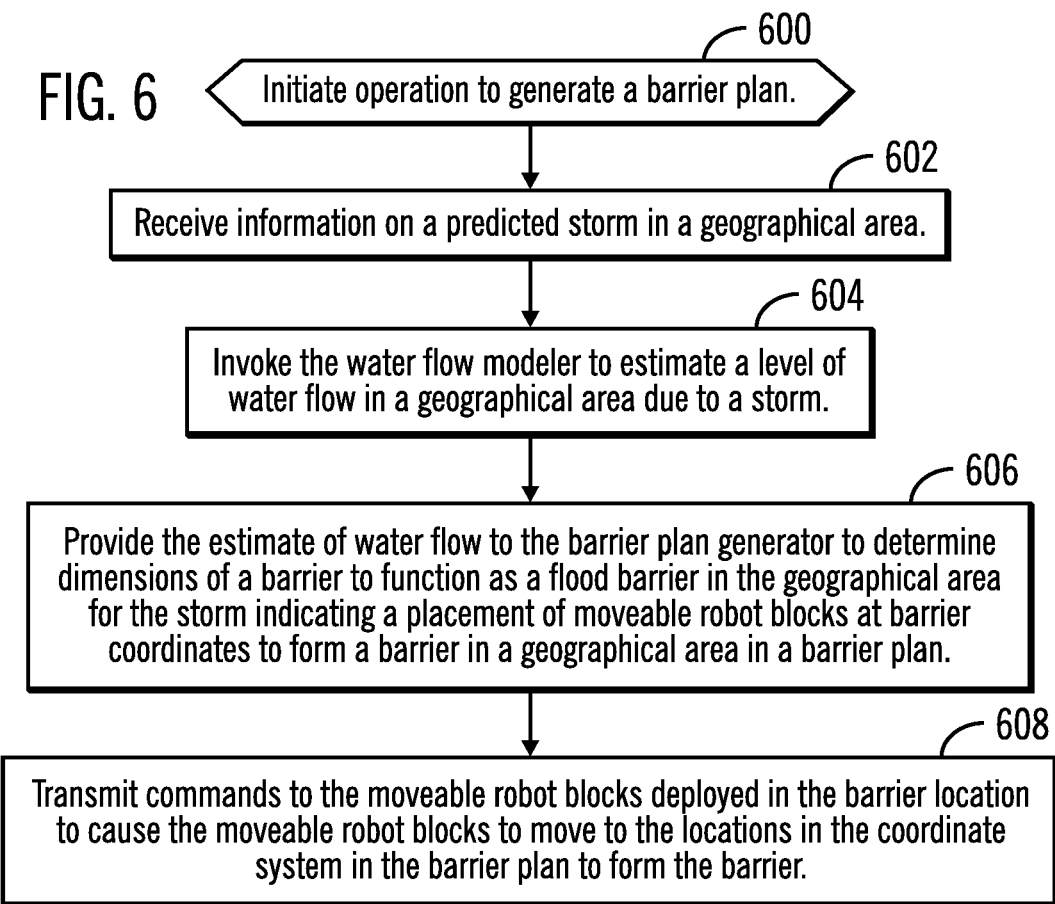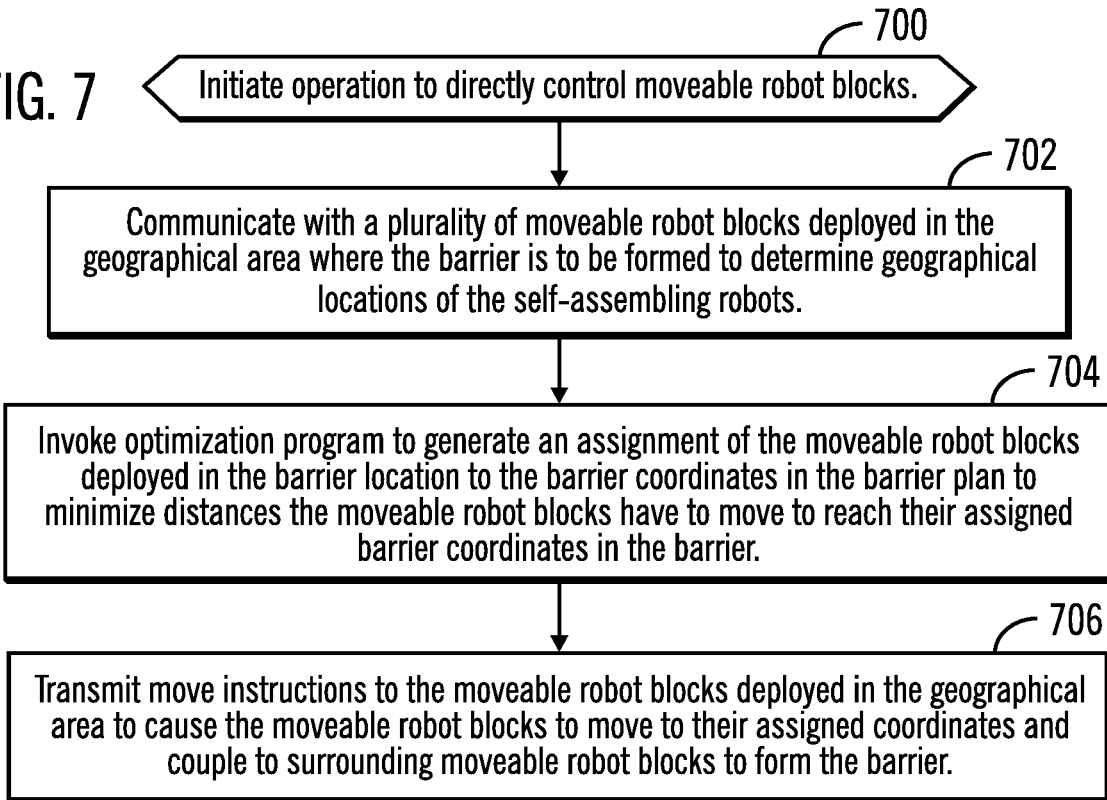

Transmitted Environmental Condition

MOVEABLE ROBOT BLOCK DEPLOYED TO FORM A BARRIER AND SENSE ENVIRONMENTAL CONDITIONS

BACKGROUND OF THE INVENTION

1. Field of the Invention

The present invention relates to a computer program product, moveable robot block, and method for a moveable robot block deployed to form a barrier and sense environmental conditions.

2. Description of the Related Art

Floods in the United States cause billions of dollars in property damage and loss of life. The most common form of flood control involves building barriers using sandbags, which are cheap and usually effective. Constructing flood barriers from sandbags is very labor intensive and when they fail to control the water flow due to a storm, they fail catastrophically. If the flood severity is higher than expected, the sandbag barriers are not flexible enough to adjust to meet the actual needs of flood conditions. It takes long time and significant effort to build effective sandbag barriers and to remove the sandbag barriers when the danger has subsided.

There is a need in the art for improved techniques for constructing barriers to prevent flood damage.

SUMMARY

Provided are a computer program product, moveable robot block, and method for a moveable robot block deployed to form a barrier and sense environmental conditions. A command is received to couple to a location in a coordinate system comprising the barrier formed of a plurality of moveable robot blocks. Movement motors are controlled to cause the moveable robot block to move to the location in the coordinate system to couple to the barrier according to the command. An environmental sensor senses an environmental condition related to water sensed external to the moveable robot block when the moveable robot block is coupled to the barrier. The environmental condition is transmitted to the assembly management system over the network.

BRIEF DESCRIPTION OF THE DRAWINGS

FIG. 6 illustrates an embodiment of operations to generate a barrier plan.

FIG. 7 illustrates an embodiment of operations to directly control moveable robot blocks to form a barrier.

DETAILED DESCRIPTION

Figure 1:
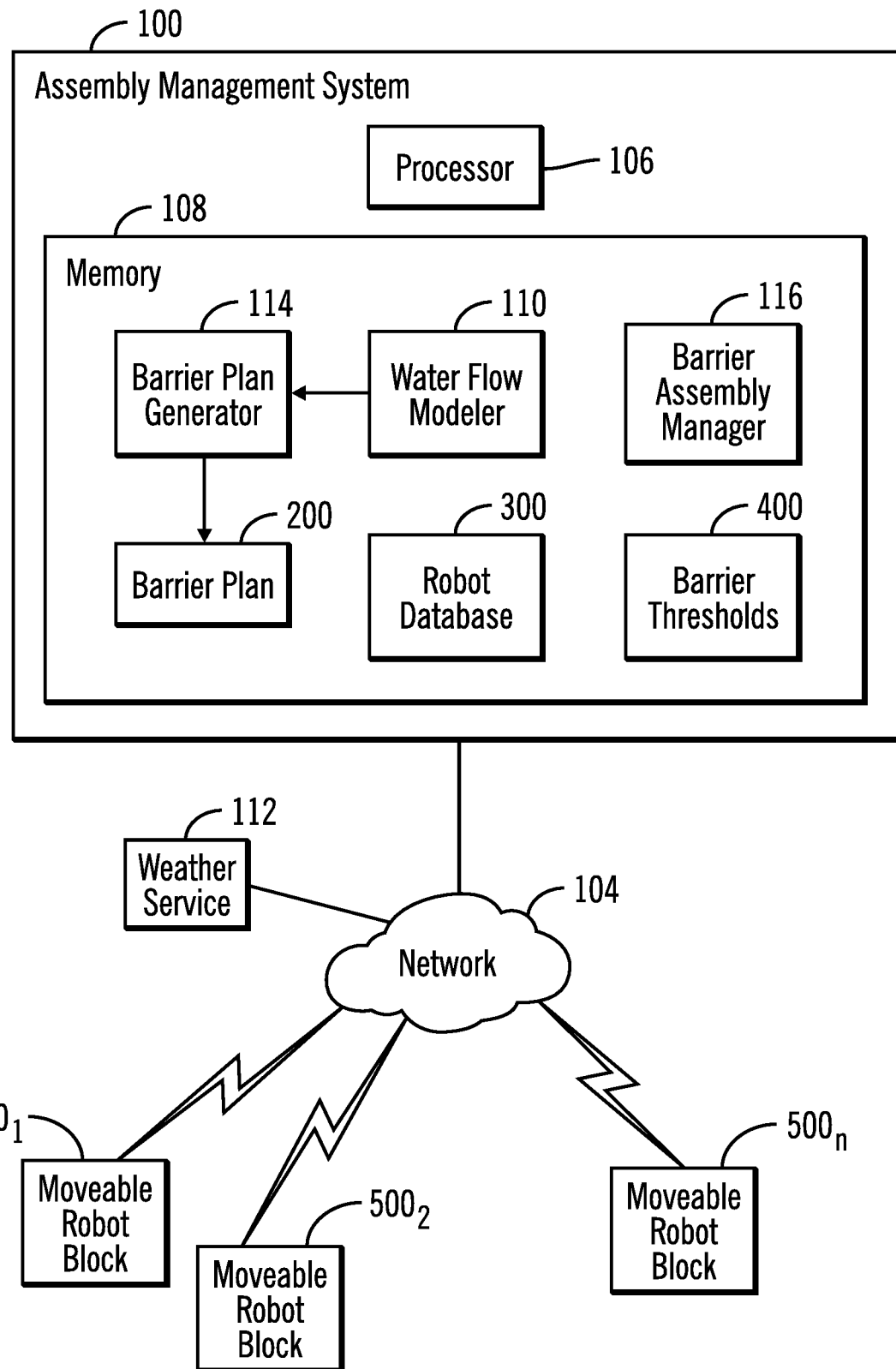
FIG. 1 illustrates an embodiment of a barrier assembly system.

As weather conditions rapidly change at different areas where barriers are constructed, there may be a need to move barriers formed at one location to another. However, this dynamic adjustment to increase or decrease a barrier size is impractical when the barrier is formed of sandbags.

Described embodiments provide improved computer technology to create a barrier and dynamically adjust a size of a barrier based on estimated weather conditions and environmental conditions detected by moveable robot blocks, such as self-assembling robots that independently move to construct the barrier, such as a flood barrier, at geographical locations where flood barriers are needed to protect property and lives.

Described embodiments provide improved technology for constructing barriers by providing an assembly management system that generates a barrier plan indicating a placement of moveable robot blocks at locations in a coordinate system to form a barrier in a geographical area. The coordinates system indicates locations for the moveable robot blocks to form the barrier. The size of the barrier may be determined by weather reports from a weather service that are used to determine a water flow at geographical locations. After generating the barrier plan, commands are transmitted to the moveable robot blocks deployed in the geographical area where the barrier is to be formed to cause the moveable robot blocks to move to the locations in the coordinate system in the barrier plan to form the barrier.

Further, with described embodiments, the moveable robot blocks may transmit environmental parameters sensed by sensors in the moveable robot blocks, such as water pressure, sensed water, etc., to the assembly management system. The assembly management system may determine whether the environmental parameters satisfy an environmental condition, such as water level to high or low, water pressure to high or low, water detected in the interior of the barrier, etc. Upon the environmental condition being satisfied, a revised barrier plan is dynamically generated to increase or decrease a size of the barrier to adjust to the environmental conditions and commands are sent to the moveable robot blocks to implement the revised barrier plan.

Embodiments of the present invention arise at least partly from a recognition that dynamically constructing or adjusting barriers responsive to predictions or conditions, including weather conditions, for example, may prevent or mitigate flood damage.

Described embodiments further provide operations for a moveable robot block, such as a self-assembling robot, to perform to couple to a barrier to from the barrier and to process environmental conditions with an environmental sensor, such as a water pressure sensor included in the moveable robot block. The moveable robot block processes a sensed environmental parameter, such as a water pressure, presence of water, etc., to determine a satisfied environmental condition to then transmit to the assembly management system to determine whether a revised barrier plan needs to be generated based on environmental conditions detected by the moveable robot block. This provides improved robot and computer technology for moveable robot blocks to form a barrier and to report on detected environmental conditions to the assembly management system managing the formation of the barrier to dynamically determine in real time whether adjustments need to be made to a size of the barrier to respond to detected environmental conditions requiring that the barrier be expanded to address additional environmental stress, i.e., increased flood waters, or reduce a size of the barrier due to an abatement in environmental conditions, flood waters receding.

FIG. 1 illustrates an embodiment of a barrier assembly environment having an assembly management system 100 that communicates with numerous moveable robot blocks $500_1, 500_2 \ldots 500_n$ over a network 104, such as self-assembling robots capable of moving to couple with each other to form a predefined structure. The assembly management system 100 includes a processor 106 and a memory 108. The processor 106 may comprise one or more central processing units (CPUs) or a group of multiple cores on a single CPU.

The memory 108 further includes a water flow modeler 110 that receives information on predicted storms and water downfall for a geographical area from an online weather service 112 over the network 104 and estimates water flow and flood risks in the geographical area. The water flow modeler 110 provides estimates of flooding at different geographical locations, including water flow, height, etc., to a barrier plan generator 114. The barrier plan generator 114 estimates barriers that should be deployed in the geographical area of the flood to act as a flood barrier to deploy along a waterway, coastal areas, or any other area where there is a flood risk. The barrier plan generator 114 generates a barrier plan 200 for each barrier to build in the geographical area for flood prevention. The barrier plan 200 specifies a coordinate system for the barrier of locations for the moveable robot blocks $500_1, 500_2 \ldots 500_n$ identified in a robot database 300 to cause the moveable robot blocks $500_1, 500_2 \ldots 500_n$ to move to the coordinates for the barrier specified in the barrier plan 200.

The memory 108 further includes a barrier assembly manager 116 to send commands to the moveable robot blocks $500_1, 500_2 \ldots 500_n$. In one embodiment, the moveable robot blocks $500_1, 500_2 \ldots 500_n$ may comprise self-assembling robots. In such a self-assembling robot embodiment, the barrier assembly manager 116 may send to each of the self-assembling robots $500_i$ the barrier plan 200 having the coordinates of the barrier and the self-assembling robots may use an assembly algorithm to swarm to the coordinates in the barrier plan 200 and couple together to form the barrier. Certain of the self-assembling robots may be positioned as seed robots to define an origin of the coordinate system defined in the barrier plan 200 and the other robots may then use a swarming or fixed self-assembly algorithm to move to coordinate positions of the barrier.

In an alternative embodiment, the barrier assembly manager 116 may send commands to control the movement of the moveable robot blocks $500_1, 500_2 \ldots 500_n$ to locations in the coordinates of the barrier plan 200 to form the barrier.

The moveable robot blocks $500_1, 500_2 \ldots 500_n$ may be of a size suitable for forming blocks in the wall and capable of movement, such as be up to several inches on each side, or larger.

The barrier assembly manager 116 maintains barrier thresholds 400 for environmental conditions to apply to the environmental parameters sensed by the moveable robot blocks $500_1, 500_2 \ldots 500_n$ that have coupled together to form the barrier. Upon thresholds being satisfied by the measured environmental parameters, the barrier assembly manager 116 may request the barrier plan generator 114 to generate a revised barrier plan $200_R$ that increases or decreases the size of the barrier depending on the detected environmental conditions.

The program components 110, 114, and 116 are shown in FIG. 1 as program code loaded into the memory 108 and executed by the processor 106. Alternatively, some or all of the functions may be implemented in hardware devices in the system 100, such as in Application Specific Integrated Circuits (ASICs) or executed by separate dedicated processors.

The arrows shown in FIG. 1 show a data flow between the components 110, 114, 200 in the memory 108.

The memory 108 may comprise a suitable volatile or non-volatile memory devices, including those described above.

Figure 2:
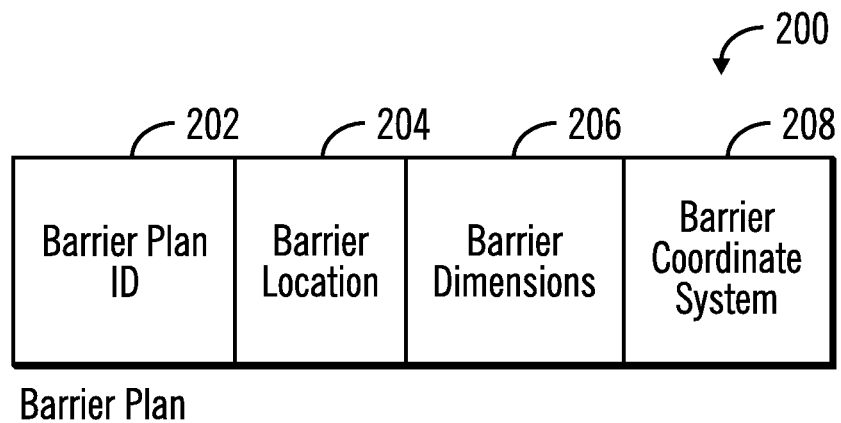
FIG. 2 illustrates an embodiment of a barrier plan to construct a barrier from moveable robot blocks.

FIG. 2 illustrates an embodiment of a barrier plan 200 generated by the barrier plan generator 114 to construct a barrier and includes: a barrier plan identifier (ID) 202; a barrier location 204 indicating a geographical location of the barrier, such as Geographical Positioning Signals (GPS); barrier dimensions 206; and barrier coordinates with respect to an origin point that comprise the barrier, such as x, y, z coordinates in three-dimensional space.

Figure 3:
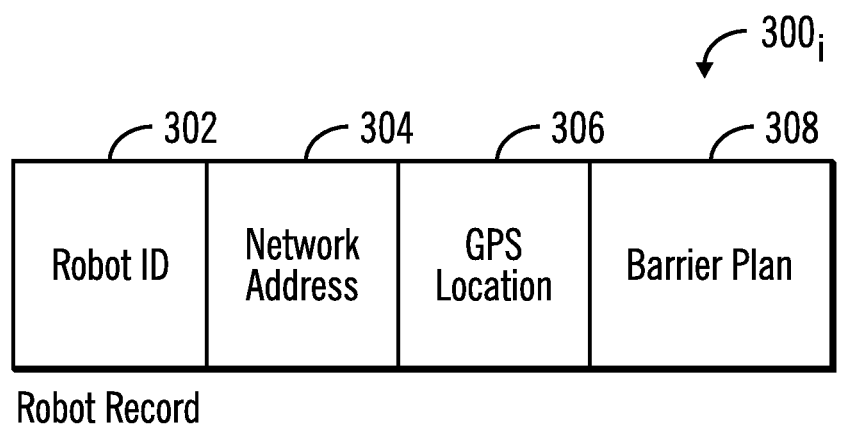
FIG. 3 illustrates an embodiment of a robot record in a robot database.

FIG. 3 illustrates an embodiment of a robot record $300_i$ in the robot database 300 having information on robots deployed at barriers, including a robot ID 302; a robot network address 304 to which commands can be transmitted; a GPS location 306 of the robot; a barrier plan ID 308 of the barrier to which the robot is deployed. The barrier assembly manager 116 may use the robot records $300_i$ to determine robots $500_i$ deployed for a barrier identified by a barrier plan 308 and communicate commands and the barrier plan 200 to the robots defined by the robot records $300_i$.

Figure 4:
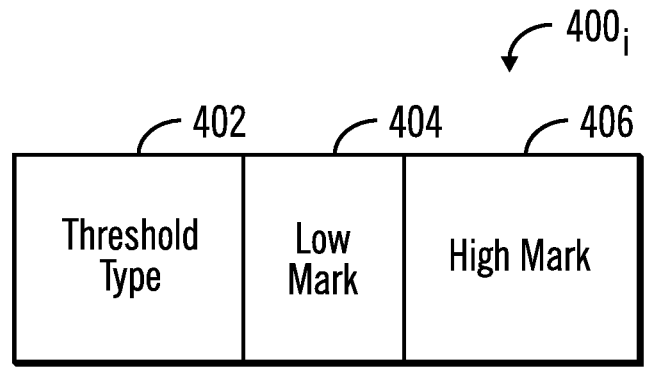
FIG. 4 illustrates an embodiment of a threshold for a threshold type used to determine when to increase or decrease a size of a barrier.

FIG. 4 illustrates an instance of a threshold $400_i$ that the barrier assembly manager 116 may use to determine whether environmental parameters sensed by the moveable robot blocks $500_1, 500_2 \ldots 500_n$ satisfy a threshold type 402, such as a water height level, water pressure threshold, presence of water, etc., and a low mark 404 (such as a low water pressure threshold or low water height) used to determine whether the barrier should be reduced in size and a high mark 406 (such as a high water pressure threshold or high water height) used to determine whether the barrier should be increased in size to address a high level of water pressure or water height. Alternatively, there may be just one threshold for a threshold type 402.

Figure 5:
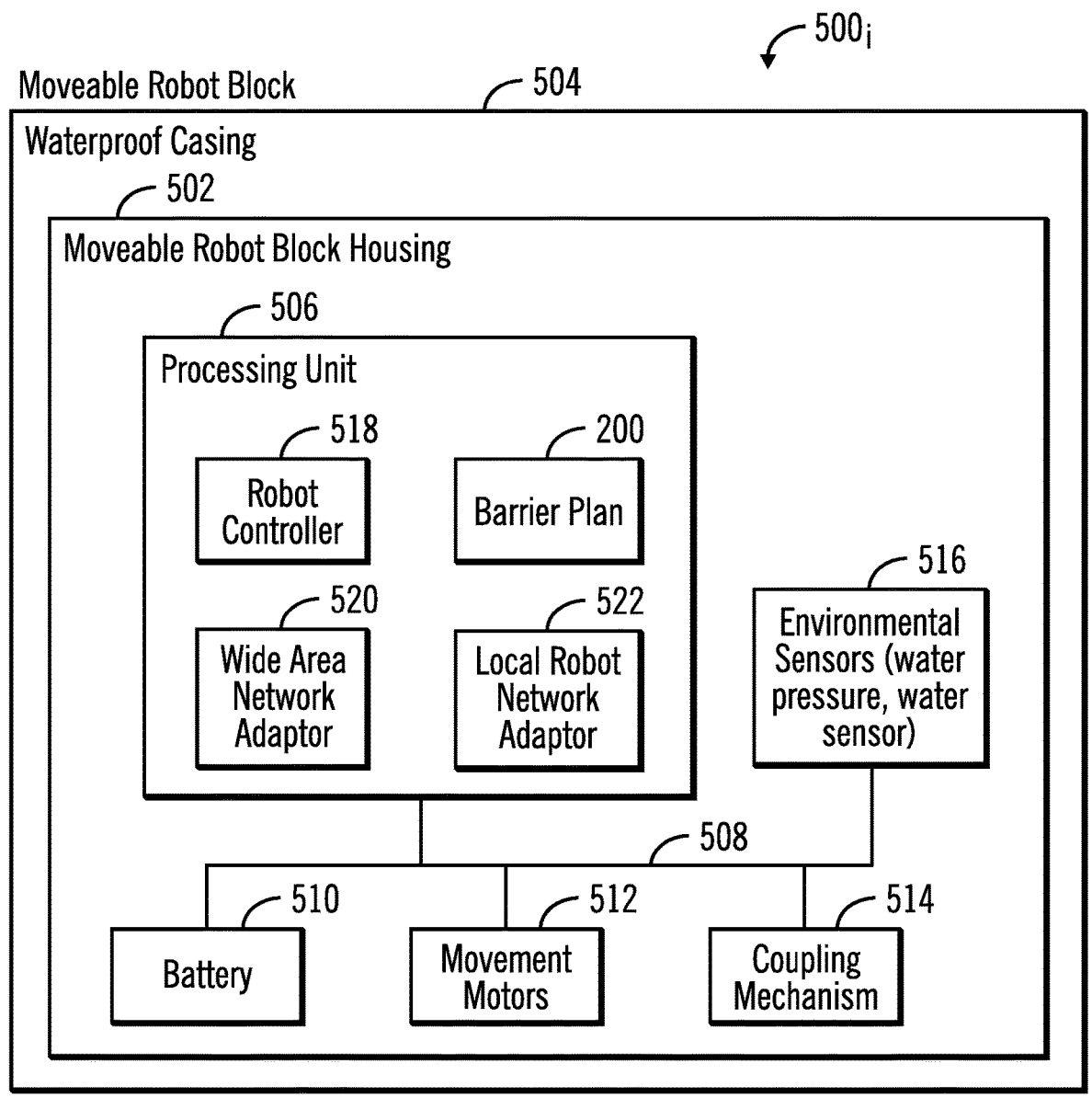
FIG. 5 illustrates an embodiment of a moveable robot block.

FIG. 5 illustrates an embodiment of a moveable robot block $500_i$ that includes a moveable robot block housing 502 surrounded by a waterproof casing 504. The housing 502 includes a processing unit 506 coupled over a bus interface 508 to a battery 510 supplying power, movement motors 512 that allow the robot block to pivot along multiple degrees of freedom; and coupling mechanisms 514 to allow the robot block $500_i$ to couple with other robot blocks, such as retractable claws used to attached to other blocks and magnets, that when activated can be drawn to other blocks; and environmental sensors 516, such as a water sensor, water pressure sensor, etc. to sense an environmental parameter, such as water. The processing unit 506 includes a robot controller 518 to control the movement and coupling and decoupling with other robots $500_j$. The processing unit 506 stores a barrier plan 200 received from the assembly management system 100 that the robot controller 518 uses to cause the movement motors 512 to move the block $500_i$ to a location in the coordinate system 208 specified in the barrier plan 200.

The moveable robot block $500_i$ may include a wide area network adaptor 520 to communicate over the network 104 with the assembly management system 100 and other moveable robot blocks $500_j$ and a local robot network adaptor 522 to communicate with other moveable robot blocks $500_j$ to form the barrier and within the barrier. The wide area network adaptor 520 may implement WiFi® technology, cellular technology, such as 2G, 3G, 4G, etc. networks, and other wireless communication technologies. The local robot network adaptor 522 may implement a WiFi®, MiFi®, Bluetooth®, tethering, and other wireless communication technologies. (Bluetooth is a registered trademark of Bluetooth Special Interest Group throughout the world Wi-Fi is a registered trademark of the Wi-Fi Alliance; MiFi is a trademark of Novatel Wireless throughout the world.)

The robot block $500_i$ may comprise various shapes, such as a square, rectangle shape, a polyhedron or other suitable shape to couple to other robot blocks to form a waterproof barrier. Further, the robot blocks $500_i$ on an outer layer of the barrier may couple to other robot blocks in the outer layer to form a water tight seal between the robot blocks $500_i$ that is impervious to water. Moveable robot blocks $500_i$ in the inner layers of the barrier may or may not form tight water impervious couplings.

In certain embodiments, the robot controller 518 may implement a self-assembling robot to be capable of coordinating with other robots to move to a coordinate in the barrier plan 200 using self-assembling and swarming algorithms.

The robot controller 518 in FIG. 5 may comprise program code loaded into a memory of the robot controller 518 and executed by a processor in the robot controller 518. Alternatively, some or all of the functions of the robot controller 518 may be implemented in hardware devices in the system 100, such as in Application Specific Integrated Circuits (ASICs) or executed by separate dedicated processors.

FIG. 6 illustrates an embodiment of operations performed by the water flow modeler 110, barrier plan generator 114, and barrier assembly manager 116 to generate a barrier plan 200 and control the moveable robot blocks 500i. Upon initiating (at block 600) an operation to generate a barrier plan 200, the assembly management system 100 receives (at block 602) information on a predicted storm, such as information of date, time, and intensity from an online weather service 112 or via user manual entry and invokes (at block 604) the water flow modeler 110 to estimate a level of water flow in a geographical area due to storm predictions. The water flow modeler 110 provides (at block 606) the estimate of water flow to the barrier plan generator 114 to determine dimensions of a barrier to function as a flood barrier in the barrier location 204 for the storm indicating a placement of moveable robot blocks at barrier coordinates 208 to form a barrier in a geographical area or barrier location 204 in a barrier plan 200. The barrier assembly manager 116 processes the barrier plan 200 to transmit (at block 608) commands to the moveable robot blocks $500_1, 500_2 \ldots 500_n$ deployed at the barrier location 204 to cause the moveable robot blocks $500_1, 500_2 \ldots 500_n$ to move to the locations comprising the barrier coordinates 208 in the barrier plan 200 to form the barrier.

In embodiments where the robots $500_i$ comprise self-assembling robots, the commands would include the barrier plan 200, including coordinates 208, to cause the robots to move to the barrier coordinates 208 to form the barrier.

The embodiment of FIG. 6 provides improvements to computer technology for constructing a barrier by generating a barrier plan having barrier coordinates generated based on current weather and water flow conditions to be capable of flood prevention for an upcoming storm. Described embodiments allow dynamic construction of a barrier by deploying robot blocks to the location of the barrier where they may then be controlled to move to coordinates of the barrier to form the barrier needed for flood prevention.

FIG. 7 illustrates an alternative embodiment of operations performed by the barrier assembly manager 116 to directly control the moveable robot blocks $500_1, 500_2 \ldots 500_n$ to move to barrier coordinates 208. Upon initiating (at block 700) operations to transmit commands to directly control the robot, the barrier assembly manager 116 communicates (at block 702) with a plurality of moveable robot blocks $500_i$ deployed in the barrier location 204 where the barrier is to be formed to determine geographical locations of the moveable robot blocks $500_i$. An optimization program generates (at block 704) a swarm plan having an assignment of the moveable robot blocks deployed in the barrier location to the barrier coordinates 208 in the barrier plan 200 to minimize distances the moveable robot blocks $500_i$ move to reach their assigned barrier coordinates in the barrier. The barrier assembly manager 116 transmits (at block 706) move instructions to the moveable robot blocks $500_1, 500_2 \ldots 500_n$ deployed in the geographical area to cause the moveable robot blocks $500_1, 500_2 \ldots 500_n$ to move to their assigned coordinates and couple to other moveable robot blocks to form the barrier.

With the alternative embodiment of FIG. 7, the barrier assembly manager 116 controls the movement of the moveable robot blocks $500_i$ by directing them to assigned coordinates 208 in the barrier plan 200.

Figure 8:
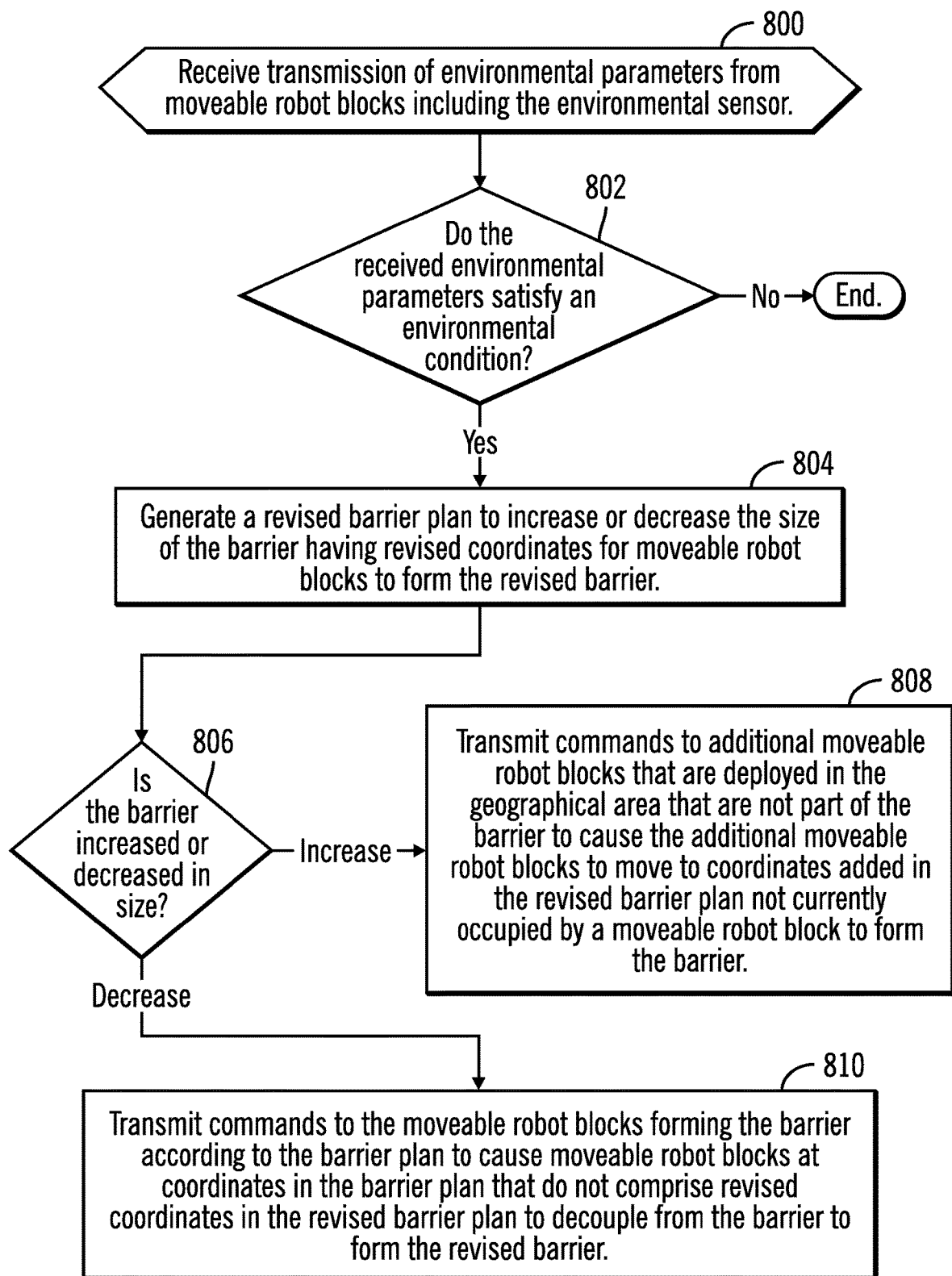
FIG. 8 illustrates an embodiment of operations to generate a revised barrier plan from transmitted environmental parameters detected by moveable robot blocks in the barrier.

FIG. 8 illustrates an embodiment of operations performed by the barrier assembly manager 116 upon receiving (at block 800) environmental parameters transmitted over the network 104 from sensors 516 from the moveable robot blocks $500_i$, such as water pressure, water presence, etc. If (at block 802) the received environmental parameters satisfy an environmental condition, such as a low 404 or high 406 mark in a threshold $400_i$, then the barrier plan generator 114 generates (at block 804) a revised barrier plan $200_R$ having revised coordinates for moveable robot blocks to form a revised barrier. If (at block 806) the revised barrier is increased in size, then the barrier assembly manager 116 transmits (at block 808) commands to additional moveable robot blocks that are deployed in the geographical area that are not part of the barrier to cause the additional moveable robot blocks to move to coordinates 208 added in the revised barrier plan $200_R$ not currently occupied by a moveable robot block $500_i$ to form the revised barrier. If (at block 806) the barrier is decreased by the revised barrier plan $200_R$, then the barrier assembly manager 116 transmits (at block 810) commands to the moveable robot blocks forming the barrier according to the previous barrier plan 200 to cause moveable robot blocks at coordinates in the barrier plan that do not comprise revised coordinates 208 in the revised barrier plan $200_R$ to decouple from the barrier to form the smaller revised barrier.

With the embodiment of FIG. 8, the barrier assembly manager 116 is capable of responding to changes in sensed environmental parameters at the moveable robot blocks $500_1, 500_2 \ldots 500_n$ forming the barrier and optimize the barrier by either adding layers of coordinates for additional moveable robot blocks to couple to the barrier to be able to withstand detected harsher environmental conditions and remove layers of coordinates to cause moveable robot blocks to decouple from the barrier if environmental conditions subside. This allows for dynamic adjustment to the barrier as needed, and moveable robot blocks $500_i$ decoupled from the barrier may then be deployed to other barriers at other geographical locations where they are needed.

Figure 9:
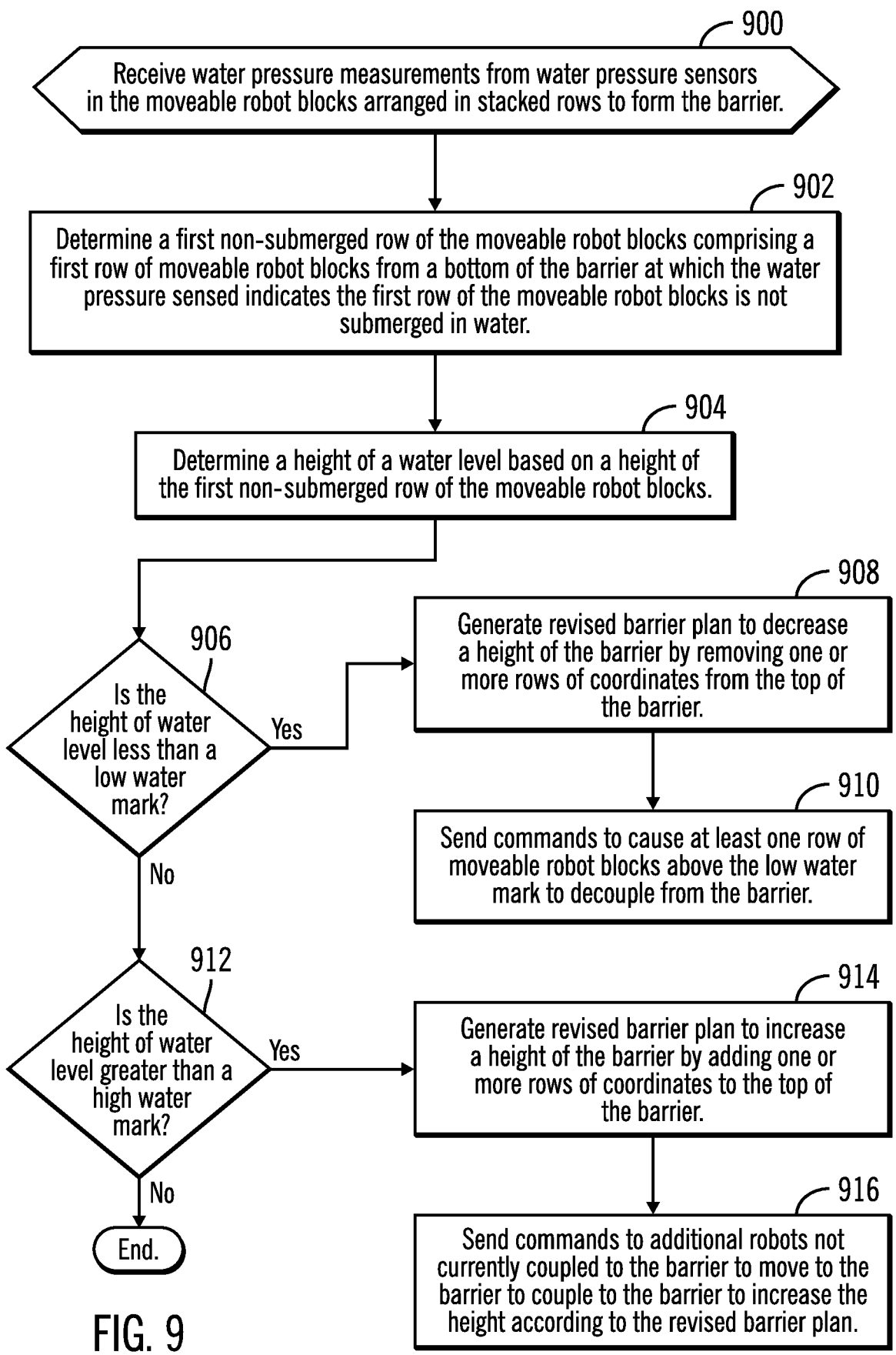
FIG. 9 illustrates an embodiment of operations to generate a revised barrier plan from transmitted water pressure measurements sensed by moveable robot blocks in the barrier indicating a height of the water level at the barrier.
Figure 10:
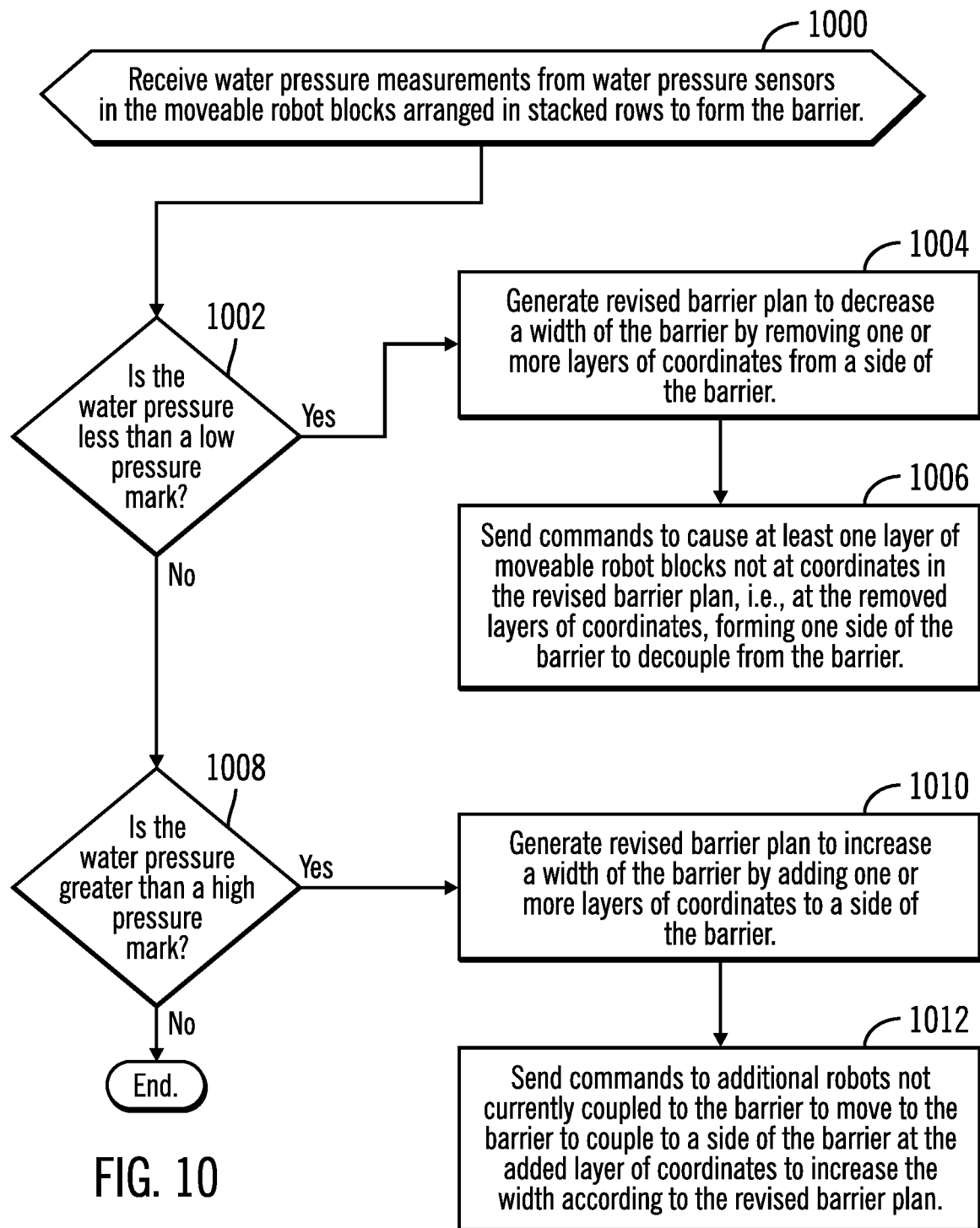
FIG. 10 illustrates an embodiment of operations to generate a revised barrier plan from transmitted water pressure measurements sensed by moveable robot blocks in the barrier based on water pressure conditions.
Figure 11:
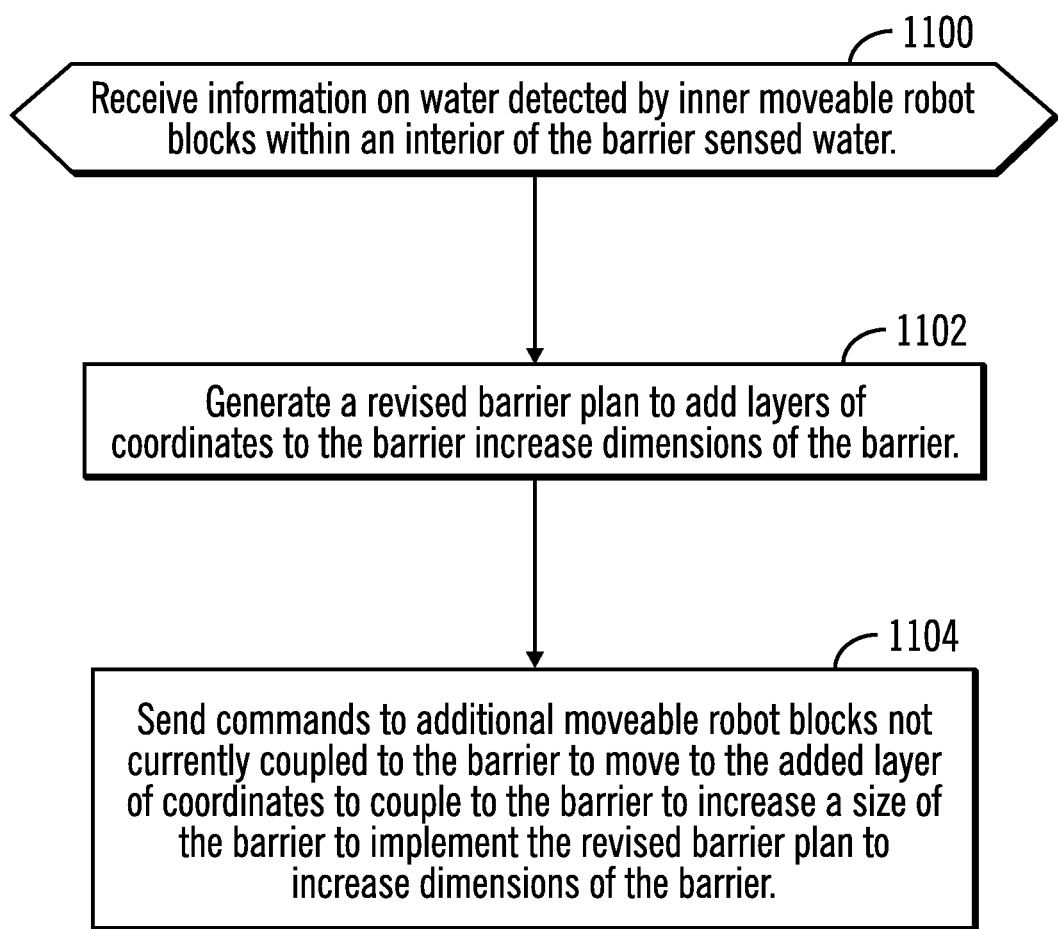
FIG. 11 illustrates an embodiment of operations to generate a revised barrier plan from information indicating water sensed by moveable robot blocks in an interior of the barrier.

FIGS. 9, 10, and 11 provide further embodiments to adjust the size of the barrier for specific environmental conditions for a barrier deployed for flood prevention.

FIG. 9 illustrates an embodiment of operations performed by the barrier assembly manager 116 to determine whether to adjust the height of the barrier based on water pressure sensors 516 detecting a height of the water level. Upon receiving (at block 900) water pressure measurements from water pressure sensors 516 in the moveable robot blocks $500_i$ arranged in stacked rows to form the barrier, the barrier assembly manager 116 determines (at block 902) a first non-submerged row of the moveable robot blocks comprising a first row of moveable robot blocks from a bottom of the barrier at which the water pressure sensed indicates the first row of the moveable robot blocks is not submerged in water. A height of the water level is determined (at block 904) based on a height of the first non-submerged row of moveable robot blocks $500_i$, where the height would be the height of the row of moveable robot blocks immediately below the first non-submerged row from the base of the barrier. If (at block 906) the height of the water level is less than a low water mark 404, then the water level has subsided and the barrier plan generator 114 is invoked (at block 908) to generate a revised barrier plan $200_R$ to decrease a height of the barrier by removing one or more rows of coordinates from the top of the barrier. Commands are sent (at block 910) to the moveable robot blocks in the barrier to cause at least one row of moveable robot blocks above the low water mark to decouple from the barrier.

If (at block 906) the height of the water is not less than the low level mark 404, but is higher (at block 912) than a high water mark 406, then the barrier assembly manager 116 generates (at block 914) a revised barrier plan $200_R$ to increase a height of the barrier by adding one or more rows of coordinates to the top of the barrier. Commands are sent (at block 916) to additional robot blocks $500_j$ not currently coupled to the barrier to move to the barrier to couple to the barrier to increase the height by adding the rows of coordinates according to the revised barrier plan $200_R$. If (at block 912) the high water mark 406 is not exceed then control ends without adjusting the barrier.

With the embodiment of FIG. 9, the height of the barrier may be adjusted based on a water level detected by the moveable robot blocks $500_i$ on an outer surface of the barrier adjacent to the flow of water. This allows dynamic adjustment to increase the height if the water level has increased during the storm and threatens to overflow the barrier or to decrease the height if the storm subsides. Decreasing the height by decoupling moveable robot blocks $500_i$ allows deployment of the blocks at locations where they are more urgently needed.

FIG. 10 illustrates an embodiment of operations performed by the barrier assembly manager 116 to determine whether to adjust a width of the barrier based on water pressure sensors 516 detecting water pressure on the barrier. Upon receiving (at block 1000) water pressure measurements from water pressure sensors 516 in the moveable robot blocks $500_i$ arranged in stacked rows to form the barrier, the barrier assembly manager 116 determines (at block 1002) whether a water pressure at the barrier, such as an average of water pressure measurements from moveable robot blocks on a surface of the barrier, is less than a low pressure mark 404. If so, the barrier assembly manager 116 invokes (at block 1004) the barrier plan generator 114 to generate a revised barrier plan $200_R$ to decrease a width of the barrier by removing one or more layers of coordinates from a side of the barrier. Commands are sent (at block 1006) to cause at least one layer of moveable robot blocks $500_i$ not at coordinates in the revised barrier plan $200_R$, i.e., at the removed layers of coordinates, forming one side of the barrier to decouple from the barrier.

If (at block 1002) the water pressure is not less than the low pressure mark 404 but greater (at block 1008) than the high pressure mark 406, then the barrier assembly manager 116 generates (at block 1010) a revised barrier plan $200_S$ to increase a width of the barrier by adding one or more layers of coordinates to a side of the barrier. Commands are sent (at block 1012) to additional robot blocks $500_j$ not currently coupled to the barrier to move to the barrier to couple to a side of the barrier at the added layer of coordinates to increase the width according to the revised barrier plan $200_R$. If (at block 1008) the high pressure mark 406 is not exceeded, then control ends without adjusting the barrier.

With the embodiment of FIG. 10, the width of the barrier may be adjusted based on a water pressure detected by the moveable robot blocks $500_i$ on an outer surface of the barrier adjacent to the flow of water. This allows dynamic adjustment to increase the width if the water level has increased during the storm and threatens to rupture the barrier and to decrease the width if the storm and water flow pressure subsides. Decreasing the width by decoupling moveable robot blocks $500_i$ allows deployment of the moveable robot blocks at locations where they are needed.

FIG. 11 illustrates an embodiment of operations performed by the barrier assembly manager 116 upon receiving information from water sensors 516 in moveable robot blocks $500_i$ in an interior of the barrier that water was sensed, which may indicate a breach in the barrier. Upon receiving (at block 1100) water sensed information from moveable robot blocks $500_i$ in the interior of the barrier, the barrier assembly manager 116 generates (at block 1102) a revised barrier plan $200_R$ to add layers of coordinates to the barrier to increase dimensions of the barrier to withstand possible leaks indicated by the water sensed in the interior. Commands are sent (at block 1104) to additional moveable robot blocks $500_j$ not currently coupled to the barrier to move to the added layer of coordinates to couple to the barrier to increase a size of the barrier to implement the revised barrier plan $200_R$ to increase dimensions of the barrier and its ability to withstand greater water flow or breaches in the barrier.

In the embodiments of FIGS. 9, 10, and 11 using self-assembling robots, the barrier assembly manager 116 may send the revised barrier plan $200_R$ to the self-assembling robots $500_i$ to cause them to determine whether to decouple or couple based on the revised plan. In an alternative embodiment, such as shown in FIG. 7, the barrier assembly manager 116 may send commands to direct moveable robot blocks to couple or decouple to the barrier to implement the revised barrier plan $200_R$.

With the embodiments of FIGS. 9, 10, and 11, the layers of coordinates for moveable robot blocks may be added or removed based on sensed environmental conditions such as water level height, water pressure in the water flow adjacent to the barrier, or water detected internal to the barrier.

Figure 12:
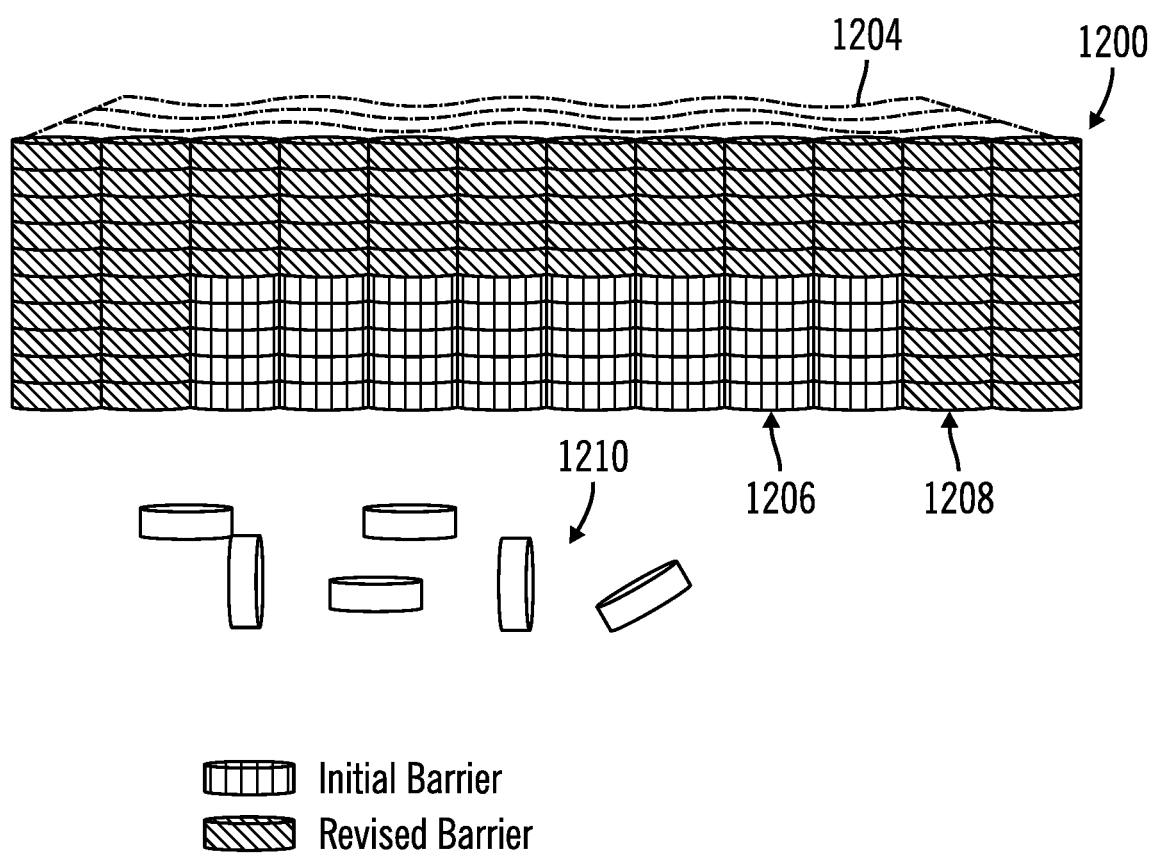
FIG. 12 illustrates an embodiment of a flood barrier.

FIG. 12 illustrates an illustration of the barrier 1200 formed of moveable robot blocks, such as 1202 to form a barrier to a body of water 1204, such as a flood. An initial barrier 1206 is first formed, and then, after the water 1204 rises, a revised barrier 1208 is formed that is both higher and of greater width. Moveable robot blocks 1210 are positioned near the barrier to move to the barrier 1200 to couple to the barrier 1200.

Figure 13:
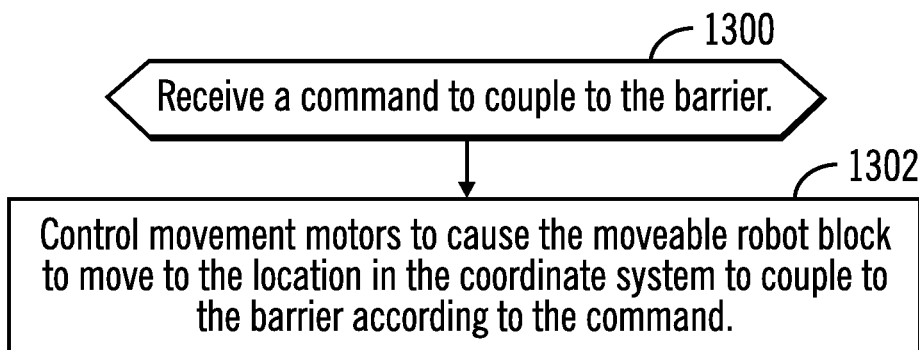
FIG. 13 illustrates an embodiment of operations for a moveable robot block to process a command to couple to a barrier.

FIG. 13 illustrates an embodiment of operations performed by the moveable robot block $500_i$ when receiving a movement command from the assembly management system 100, such as in FIG. 7. Upon the moveable robot block receiving (at block 1300) a command to couple to the barrier, which may comprise the move instructions sent at block 706 in FIG. 7 to move to a location of assigned coordinates in the coordinate system 208, the robot controller 518 controls (at block 1302) movement motors 512 to cause the moveable robot block $500_i$ to move to the location in the coordinate system to couple to the barrier according to the received command at the indicted coordinates/location.

Figure 14:
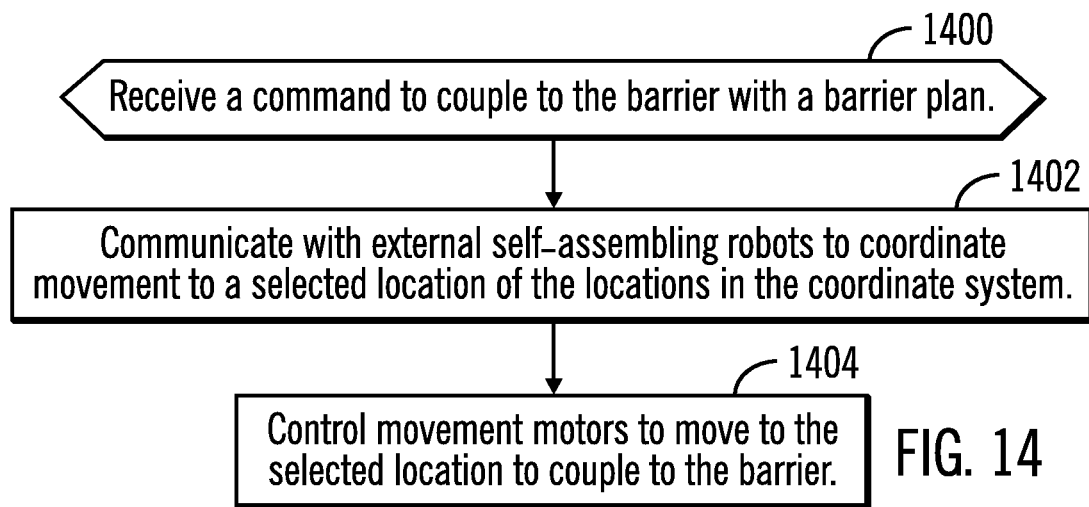
FIG. 14 illustrates an embodiment of operations for a moveable robot block to process a command with a barrier plan to couple to a barrier.

FIG. 14 illustrates an alternative embodiment of operations performed by the moveable robot block $500_i$ comprising a self-assembling robot when receiving a barrier plan 200 from the assembly management system 100. The barrier plan 200 indicates a placement of moveable robot blocks at locations in a coordinate system 208 to form a barrier in a geographical area 204. The coordinate system 208 indicates locations for the moveable robot blocks to form the barrier. Upon receiving (at block 1400) the barrier plan with a command to couple to the barrier, via the wide area network adaptor 520 from the assembly management system 100 over the network 104, the robot controller 518 communicates (at block 1402) with external self-assembling robots $500_j$, over the local robot network adaptor 522, to coordinate movement to a selected location of the locations in the coordinate system 208. The robot controller 518 controls (at block 1404) the movement motors 512 to move to the selected location to couple to the barrier 1200, adjusting the selected location depending on actions by other self-assembling robots $500_j$ swarming according to an assembly and swarming algorithms to form the barrier according to the barrier plan 200.

Figure 15:
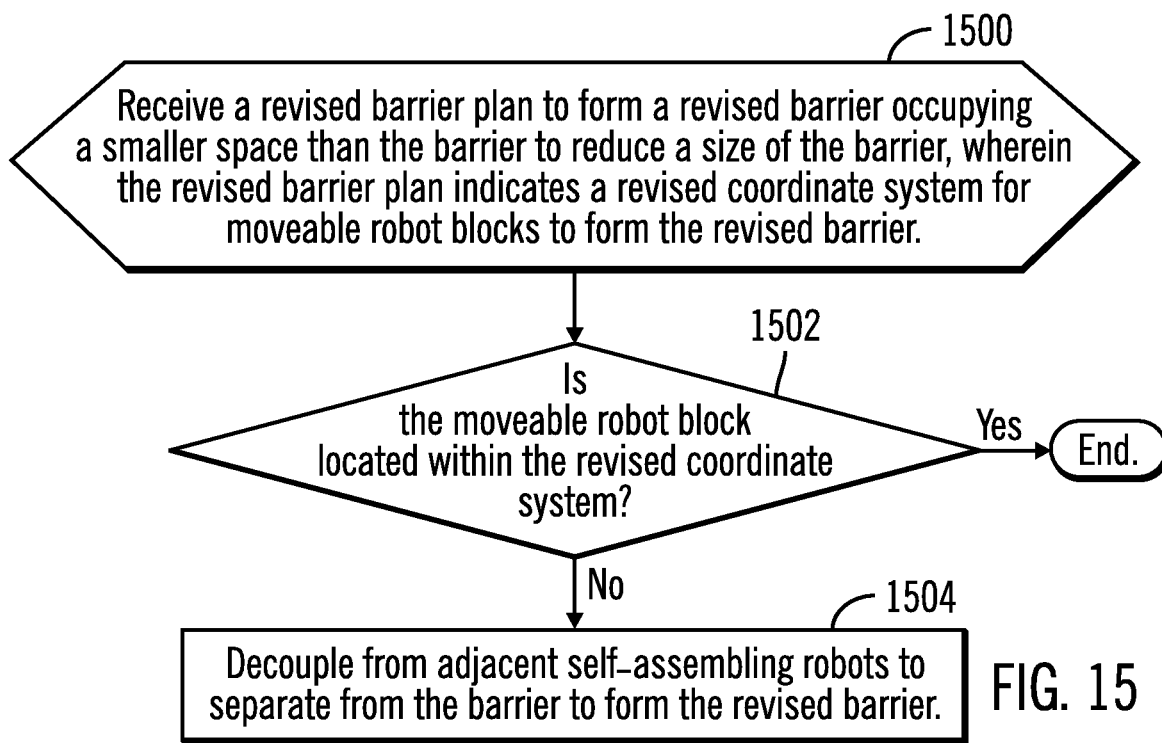
FIG. 15 illustrates an embodiment of operations for a moveable robot block to process a revised barrier plan.

FIG. 15 illustrates an alternative embodiment of operations performed by the moveable robot block $500_i$ to process a revised barrier plan $200_R$ which specifies a barrier larger or smaller than a previous barrier 200 to which the moveable robot block $500_i$ is coupled. Upon receiving (at block 1500) a revised barrier plan $200_R$ to form a revised barrier 1206 occupying a smaller space than the current barrier 1208 to reduce a size of the current barrier 1208, wherein the revised barrier plan $200_R$ indicates a revised coordinate system 208 for moveable robot blocks to form the revised barrier, the robot controller 518 determines (at block 1502) whether the moveable robot block $500_i$ is located, while coupled to the barrier, within the revised coordinate system 208 of the revised barrier plan $200_R$. If so, control ends because the moveable robot block $500_i$ is part of the revised barrier. If (at block 1502) the moveable robot block is no longer in the coordinate system 208, then the moveable robot block $500_i$ decouples (at block 1504) from adjacent self-assembling robots to separate from the barrier to form the revised barrier. The robot controller 518 may control the coupling mechanism 514 to decouple from attached adjacent self-assembling robots $500_j$, such as causing a latch or magnet to disengage from attached self-assembling robots $500_j$.

Figure 16:
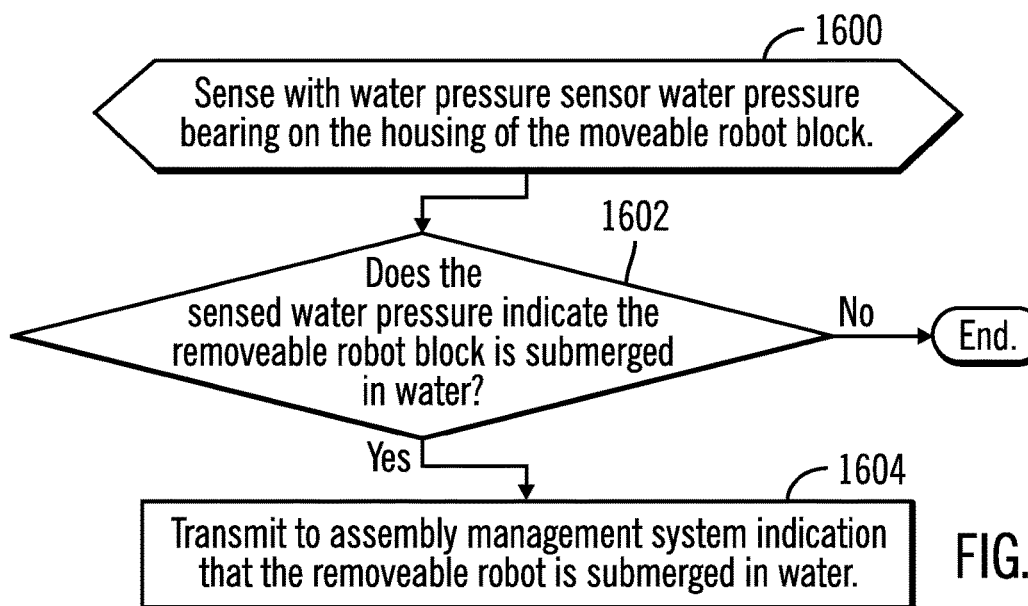
FIG. 16 illustrates an embodiment of operations for a moveable robot block to process a sensed water pressure at the moveable robot block in the barrier.

FIG. 16 illustrates an embodiment of operations performed by the moveable robot block $500_i$ to process a water pressure sensed by a water pressure sensor 516. Upon sensing (at block 1600) a water pressure from the sensor 516, the robot controller 518 determines (at block 1602) whether the sensed water pressure indicates the movable robot block $500_i$ is submerged in water. If so, then the robot controller 518 transmits (at block 604) to the assembly management system 100 indication that the movable robot block is submerged. If (at block 1602) the sensed water pressure does not indicate submersion, then control ends.

In embodiments where the moveable robot block $500_i$ communicates with the assembly management system 100, if the movable robot block $500_i$ is submerged, then it communicate with the assembly management system 100 over the wide area network adaptor 520 if the wide area network adaptor 520 is capable of transmitting through water to space above the water. Alternatively, if submerged, the movable robot block $500_i$ may communicate via the local robot network adaptor 522 to another movable robot block $500_j$ that is not submerged or closest to the water line, and the receiving robot block $500_j$ may forward the transmission to another movable robot block or to the network 104 via the wide area network adaptor 520. In this way, submerged robot blocks may communicate to the assembly management system 100 directly over the wide area network adaptor 520 and network 104 if communication through water is feasible or indirectly by transmitting to adjacent moveable robot blocks through the local robot network adaptor 522.

Figure 17:
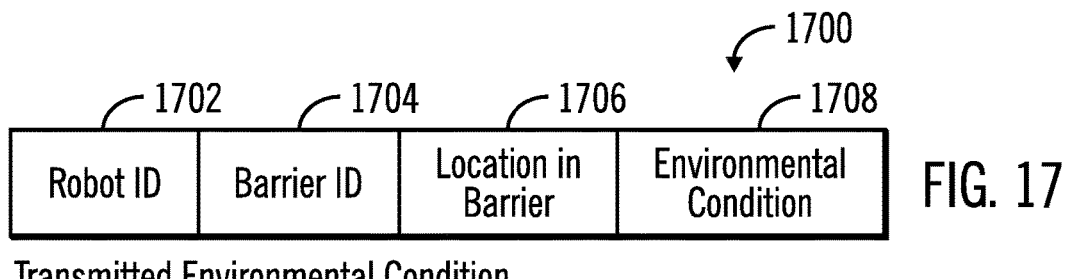
FIG. 17 illustrates an embodiment of a transmitted environmental condition from a moveable robot block to the assembly management system.

FIG. 17 illustrates an embodiment of a communication or transmitted environmental condition 1700 sent from the moveable robot block $500_i$ to the assembly management system 100, and includes a robot identifier 1702 of the transmitting moveable robot block; a barrier identifier 1704 identifying the barrier or barrier plan 200, in which the movable robot block 1702 is deployed; a location in the barrier 1706, such as a coordinate in the barrier coordinate system 208 of the barrier 1702; and an environmental condition 1708 detected at the moveable robot block $200_i$, such as a water pressure, indication of presence of water or some result of comparing sensed values. The transmitted environmental condition 1700 may be received for processing by the assembly management system 100 according to FIGS. 8, 9, 10, and 11.

Figure 18:
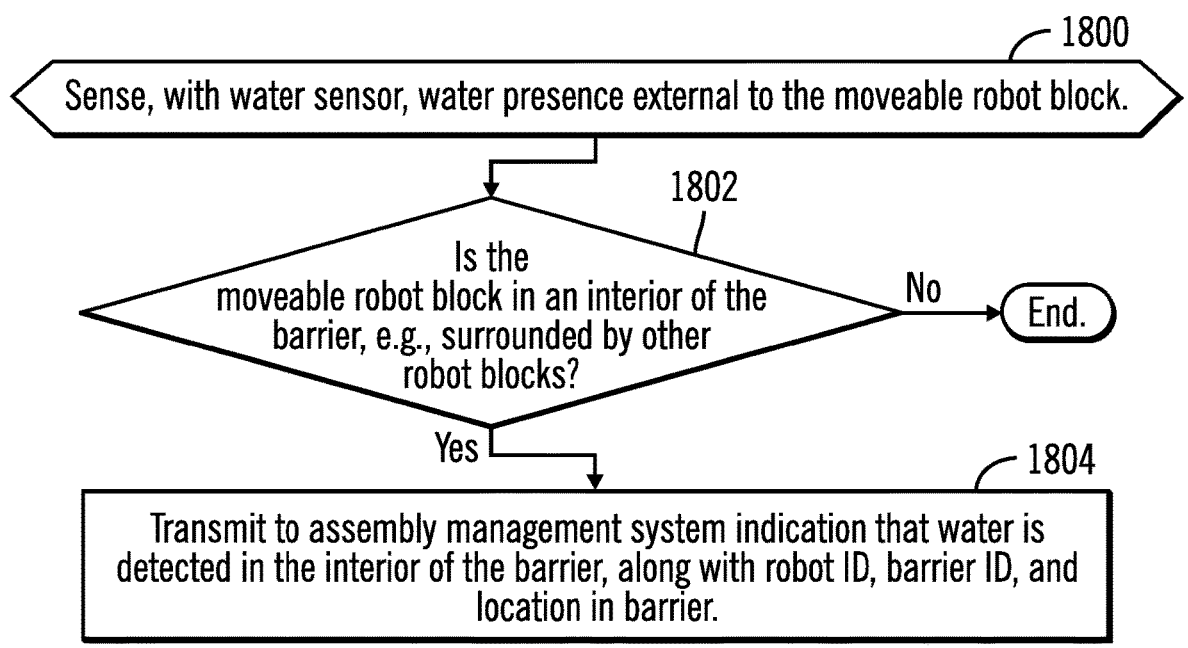
FIG. 18 illustrates an embodiment of operations for a moveable robot block to process a sensed water presence at the moveable robot block in the barrier.

FIG. 18 illustrates an embodiment of operations performed by the moveable robot block $500_i$ to process a water presence detected by a water detection sensor 516. Upon sensing (at block 1800) with water sensor 516 a water presence external to the movable robot block $500_i$, the presence may be determined for a threshold amount of water, but not necessarily requiring the robot block $500_i$ is submerged, if (at block 1802) the moveable robot block $500_i$ is at a location in the coordinate system 208 in an interior of the barrier, i.e., surrounded on all sides by other moveable robot blocks $500_j$, then the robot controller 518 transmits (at block 1804) to the assembly management system 100 indication that water is detected as an environmental condition 1708 in the transmitted environmental condition 1700. If (at block 1802) the moveable robot block is not in the interior of the barrier, such as on an exterior of the barrier, then control ends.

The transmitted environmental condition 1700 in FIG. 18 may be processed by the assembly management system 100 according to the operations in FIG. 11 to increase the size of the barrier if water is detected in the interior according to FIG. 17, indicating that the barrier is not sufficient to handle the stress of the water flow 1204, resulting in water detected in the interior of the barrier 1206.

Figure 19:
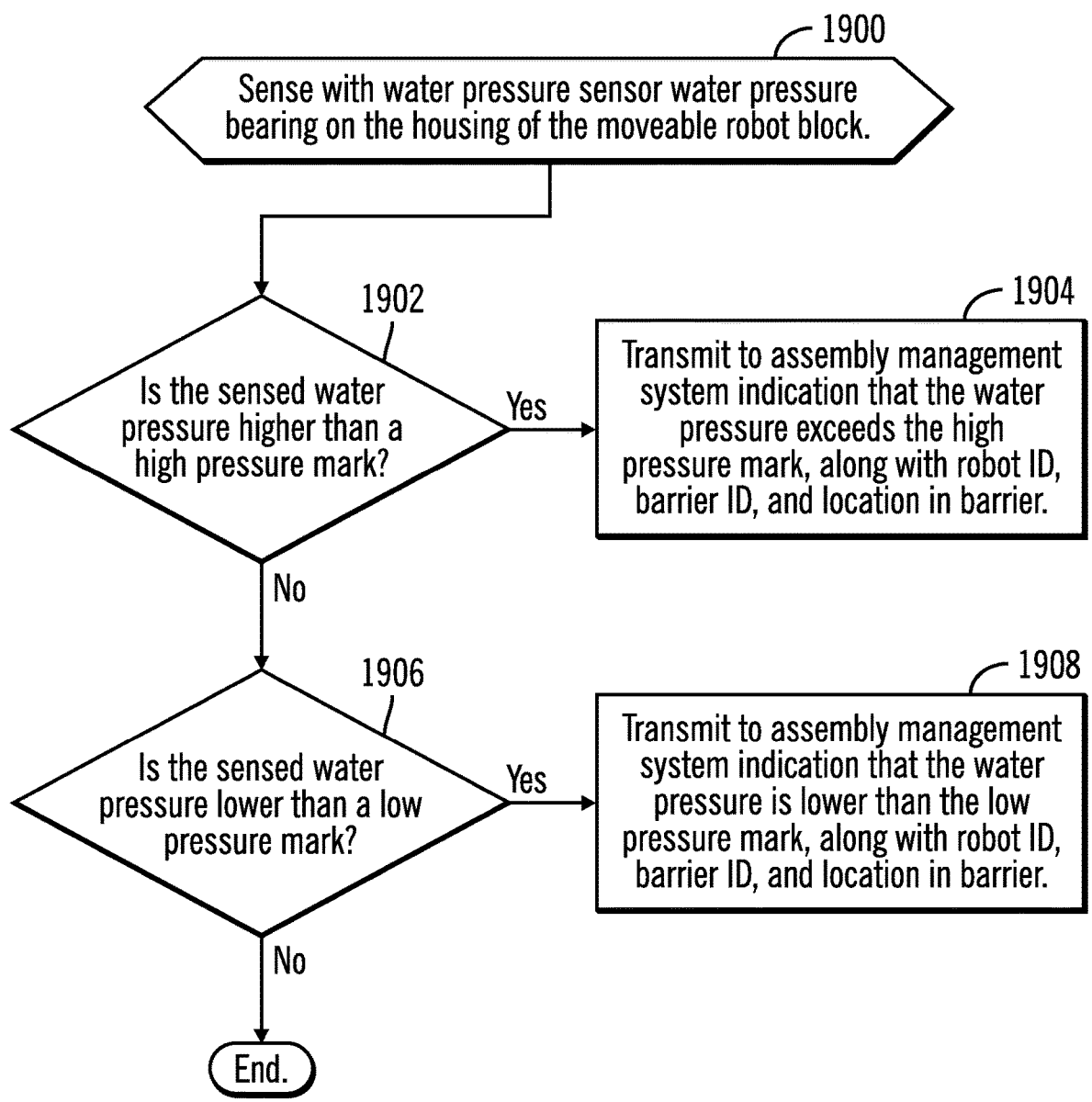
FIG. 19 illustrates an embodiment of operations for a moveable robot block to process a sensed water pressure at the moveable robot block in the barrier.

FIG. 19 illustrates an embodiment of operations performed by the moveable robot block $500_i$ to process a water pressure bearing on the exterior of the moveable robot block $500_i$ sensed by a water pressure sensor 516. Upon detecting (at block 1900) water pressure, if (at block 1902) the sensed water pressure is higher than a high pressure mark, then the robot controller 518 transmits (at block 1904) to the assembly management system 100 indication the water pressure exceeds the high pressure mark as an environmental condition 1708 in the transmitted environmental condition 1700. If (at block 1902) the high pressure mark is not exceeded and if (at block 1906) the sensed water pressure is lower than a lower pressure mark, then the robot controller 518 transmits (at block 1908) to the assembly management system 100 indication the water pressure is lower than the low pressure mark as an environmental condition 1708 in the transmitted environmental condition 1700.

The transmitted environmental condition 1700 in FIG. 19 may be processed by the assembly management system 100 according to the operations of FIG. 10 to generate a revised barrier $200_R$ to increase the size 1206 of the barrier to a larger barrier 1208 if the water pressure exceeds the high pressure mark or decrease the size of the barrier 1208 to a smaller barrier 1206 if the water pressure is lower than the low pressure mark. Detecting too high of pressure indicates that the barrier needs to be increased due to a risk it will be overwhelmed by the water flow 1204.

Figure 20:
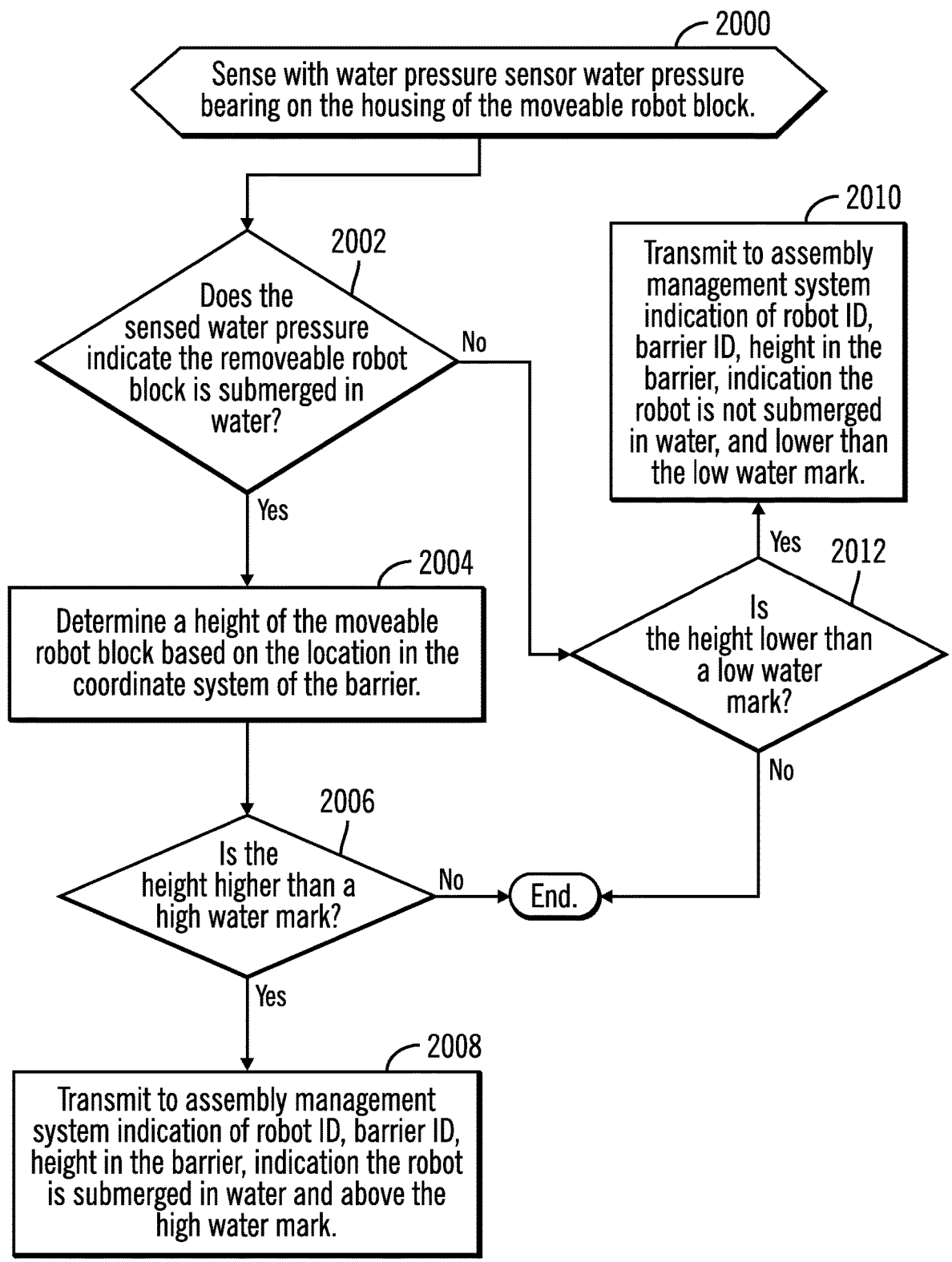
FIG. 20 illustrates an embodiment of operations for a moveable robot block to process a sensed water pressure at the moveable robot block in the barrier.

FIG. 20 illustrates an embodiment of operations performed by the moveable robot block $500_i$ to process a water pressure bearing on the exterior of the moveable robot block $500_i$ sensed by a water pressure sensor 516 to determine if the wall is too low or too high given the water 1204 level. Upon detecting (at block 2000) water pressure, if (at block 2002) the sensed water pressure indicates the moveable robot block $500_i$ is submerged in water, then a height of the moveable robot block $500_i$ is determined (at block 2004) based on its location in the coordinate system 208 of the barrier. If (at block 2006) the height is higher than a high water mark, then the robot controller 518 transmits (at block 2008) to the assembly management system 100 the transmission 1700 with indication of robot ID 1702, barrier ID 1704, location in the barrier 1706 and environmental conditions 1708 of a height in the barrier and indication the robot is submerged in water and above the high water mark. If (at block 2002) the water pressure sensor 416 indicates the moveable robot block $500_i$ is not submerged and if (at block 2012) the height is lower than a low water mark, then the robot controller 518 transmits (at block 2010) to the assembly management system 100 the transmission 1700 with indication of robot ID 1702, barrier ID 1704, location in the barrier 1706 and environmental conditions 1708 of a height in the barrier and indication the robot is not submerged in water and below the high water mark. If (from the no branch of block 2006 or 2012) the height is between the low and high water marks, then control ends without transmitting environmental conditions to the assembly management system 100.

The transmitted environmental condition 1700 in FIG. 19 may be processed by the assembly management system 100 according to the operations of FIG. 9 to generate a revised barrier $200_R$ to increase the height of the barrier 1206 to a higher barrier 1208 if the water level exceeds the high water mark or decrease the height of the barrier 1208 to a shorter barrier 1206 if the water level is lower than the low water mark.

In the described embodiment, variables "i", "j", "n", "R", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIGS. 1 and 5, including the assembly management system 100 and moveable robot blocks $500_1$, $500_2$ ... $500_n$, $500_i$ may be implemented in one or more computer systems, such as the computer system 2100 shown in FIG. 21. Computer system/server 2102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2102 may be practiced in distributed cloud computing environments where tasks are performed by remote processing devices that are linked through a communications network. In a distributed cloud computing environment, program modules may be located in both local and remote computer system storage media including memory storage devices.

Figure 21:
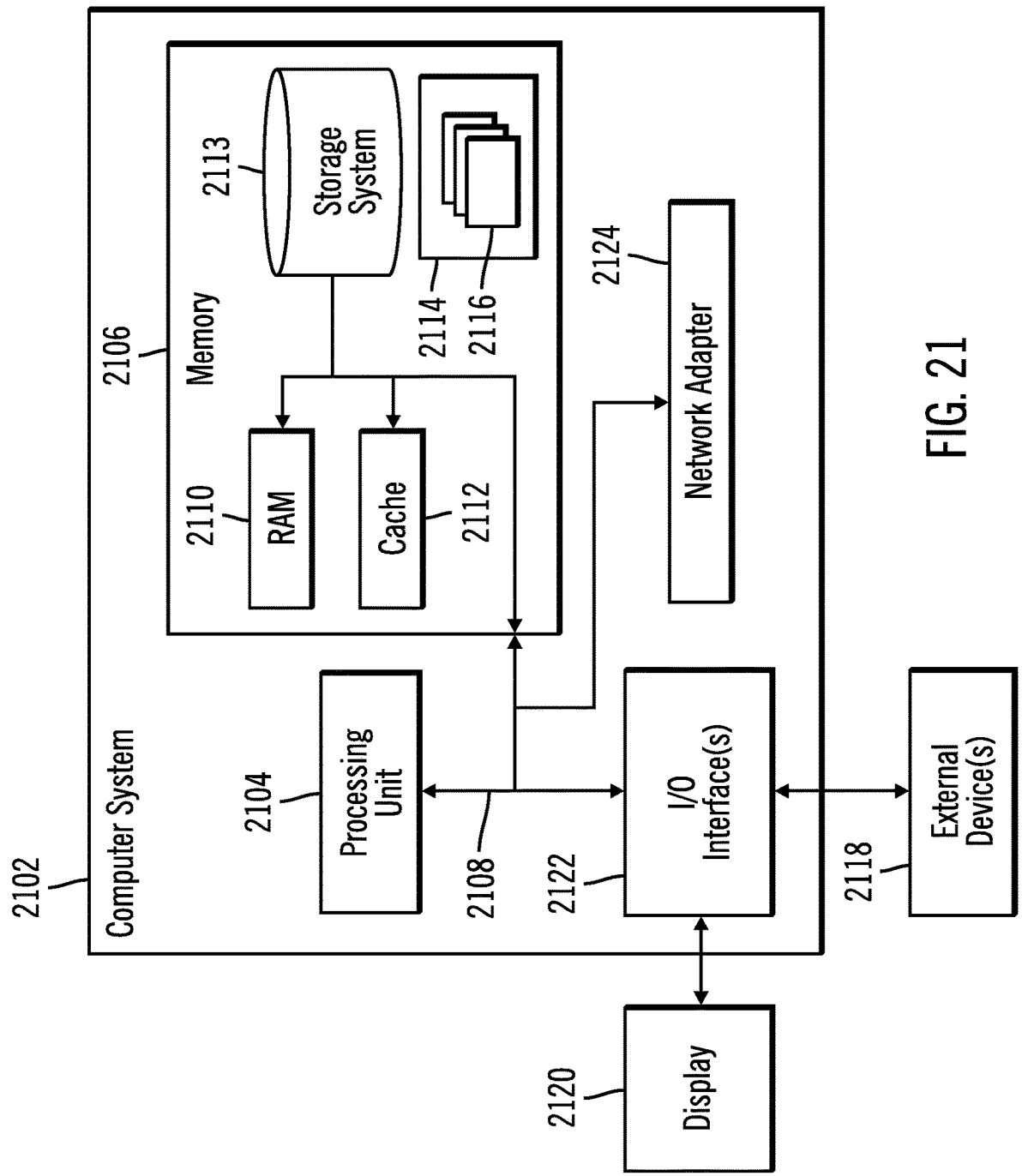
FIG. 21 illustrates a computing environment in which the components of FIGS. 1 and 5 may be implemented.

As shown in FIG. 21, the computer system/server 2102 is shown in the form of a general-purpose computing device. The components of computer system/server 2102 may include, but are not limited to, one or more processors or processing units 2104, a system memory 2106, and a bus 2108 that couples various system components including system memory 2106 to processor 2104. Bus 2108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2102 typically includes a variety of computer system readable media. Such media may be any available media that is accessible by computer system/server 2102, and it includes both volatile and non-volatile media, removeable and non-removeable media.

System memory 2106 can include computer system readable media in the form of volatile memory, such as random access memory (RAM) 2110 and/or cache memory 2116. Computer system/server 2102 may further include other removeable/non-removeable, volatile/non-volatile computer system storage media. By way of example only, storage system 2113 can be provided for reading from and writing to a non-removeable, non-volatile magnetic media (not shown and typically called a "hard drive"). Although not shown, a magnetic disk drive for reading from and writing to a removeable, non-volatile magnetic disk (e.g., a "floppy disk"), and an optical disk drive for reading from or writing to a removeable, non-volatile optical disk such as a CD-ROM, DVD-ROM or other optical media can be provided. In such instances, each can be connected to bus 2108 by one or more data media interfaces. As will be further depicted and described below, memory 2106 may include at least one program product having a set (e.g., at least one) of program modules that are configured to carry out the functions of embodiments of the invention.

Program/utility 2114, having a set (at least one) of program modules 2116, may be stored in memory 2106 by way of example, and not limitation, as well as an operating system, one or more application programs, other program modules, and program data. Each of the operating system, one or more application programs, other program modules, and program data or some combination thereof, may include an implementation of a networking environment. The components of the computer 2102 may be implemented as program modules 2116 which generally carry out the functions and/or methodologies of embodiments of the invention as described herein. The systems of FIG. 1 may be implemented in one or more computer systems 2102, where if they are implemented in multiple computer systems 2102, then the computer systems may communicate over a network.

Computer system/server 2102 may also communicate with one or more external devices 2118 such as a keyboard, a pointing device, a display 2160, etc.; one or more devices that enable a user to interact with computer system/server 2102; and/or any devices (e.g., network card, modem, etc.) that enable computer system/server 2102 to communicate with one or more other computing devices. Such communication can occur via Input/Output (I/O) interfaces 2122. Still yet, computer system/server 2102 can communicate with one or more networks such as a local area network (LAN), a general wide area network (WAN), and/or a public network (e.g., the Internet) via network adapter 2124. As depicted, network adapter 2124 communicates with the other components of computer system/server 2102 via bus 2108. It should be understood that although not shown, other hardware and/or software components could be used in conjunction with computer system/server 2102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product deployed in a moveable robot block to form a barrier and communicate with an assembly management system over a network, the computer program product comprising a non-transitory computer readable storage medium storing computer readable program code that when executed performs operations, the operations comprising:

receiving a command to couple the moveable robot block to a location in a coordinate system comprising the barrier formed of a plurality of moveable robot blocks;

controlling movement motors to cause the moveable robot block to move to the location in the coordinate system to couple to the barrier according to the command;

sensing, with an environmental sensor, an environmental condition related to water sensed external to the moveable robot block when the moveable robot block is coupled to the barrier at a position in the coordinate system, the moveable robot block including the environmental sensor; and transmitting the environmental condition to the assembly management system over the network to determine whether to adjust the barrier.

2. The computer program product of claim 1, wherein the moveable robot block comprises a self-assembling robot implementing a self-assembly algorithm, wherein the command includes a barrier plan indicating a placement of self-assembling robots at locations in a coordinate system to form a barrier in a geographical area, wherein the coordinate system indicates locations for the self-assembling robots to form the barrier, wherein the operations further comprise:

communicating with external self-assembling robots to coordinate movement to a selected location of the locations in the coordinate system, wherein the movement motors are controlled to move to the selected location to couple to the barrier.

3. The computer program product of claim 2, wherein the operations further comprise:

receiving a revised barrier plan to form a revised barrier occupying a smaller space than the barrier to reduce a size of the barrier, wherein the revised barrier plan indicates a revised coordinate system for the self-assembling robots to form the revised barrier;

determining whether the selected location is within the revised coordinate system; and decoupling from at least one adjacent self-assembling robot to separate from the barrier to form the revised barrier in response to determining that the selected location is not within the revised coordinate system.

4. The computer program product of claim 1, wherein the plurality of moveable robot blocks are stacked in rows to form the barrier, wherein the environmental sensor comprises a water pressure sensor to sense water pressure bearing on the moveable robot block, wherein the operations further comprise:

determining whether the sensed water pressure indicates that the moveable robot block is submerged in water, wherein the environmental condition indicates whether the moveable robot block is submerged or is not submerged in water.

5. The computer program product of claim 4, wherein the operations further comprise:

determining a height of the moveable robot block in the barrier, wherein the environmental condition indicates the height.

6. The computer program product of claim 1, wherein moveable robot blocks are stacked in rows to form the barrier, wherein the environmental sensor comprises a water pressure sensor to sense water pressure bearing on the moveable robot block, wherein the operations further comprise:

determining whether the sensed water pressure indicates that the moveable robot block is submerged in water;

determining whether a height of the moveable robot block is higher than a high water mark in response to determining that the moveable robot block is submerged in water, wherein the environmental condition is transmitted and indicates that a water level exceeds the high water mark in response to determining that the height is higher than the high water mark and the moveable robot block is submerged in water; and determining whether the height of the moveable robot block is lower than a low water mark in response to determining that the moveable robot block is not submerged in water, wherein the environmental condition is transmitted and indicates that a water level is below the low water mark in response to determining that the height is lower than the low water mark and the moveable robot block is not submerged in water.

7. The computer program product of claim 1, wherein the plurality of moveable robot blocks are stacked in rows to form the barrier, wherein the environmental sensor comprises a water pressure sensor to sense water pressure bearing on the moveable robot block, wherein the operations further comprise:

determining a sensed water pressure from the water pressure sensor; and determining whether the sensed water pressure is higher than a high pressure mark, wherein the environmental condition is transmitted and indicates that the sensed water pressure exceeds the high pressure mark in response to determining that the water pressure is higher than the high pressure mark.

8. The computer program product of claim 1, wherein the environmental sensor comprises a water sensor to sense water bearing on a surface of the moveable robot block, wherein the operations further comprise:

determining whether the water sensor senses water; and determining whether the moveable robot block located within an interior of the barrier, wherein the environmental condition is transmitted and indicates that the water is sensed in response to determining that the water sensor senses water and that the moveable robot block is determined located within the interior of the barrier.

9. The computer program product of claim 1, wherein the environmental condition is transmitted with an identifier of the moveable robot block, an identifier of the barrier to which the moveable robot block is coupled, and a location in the barrier.

10. A moveable robot block in communication with an assembly management system over a network to form a barrier, comprising:

movement motors;

an environmental sensor; and a robot controller executing program instructions to perform operations, the operations comprising:

receiving a command to couple the moveable robot block to a location in a coordinate system comprising the barrier formed of a plurality of moveable robot blocks;

controlling the movement motors to cause the moveable robot block to move to the location in the coordinate system to couple to the barrier according to the command;

sensing, with the environmental sensor, an environmental condition related to water sensed external to the moveable robot block when the moveable robot block is coupled to the barrier at a position in the coordinate system, the moveable robot block including the environmental sensor; and transmitting the environmental condition to the assembly management system over the network to determine whether to adjust the barrier.

11. The moveable robot block of claim 10, wherein the moveable robot block comprises a self-assembling robot implementing a self-assembly algorithm, wherein the command includes a barrier plan indicating a placement of self-assembling robots at locations in a coordinate system to form a barrier in a geographical area, wherein the coordinate system indicates locations for the self-assembling robots to form the barrier, wherein the operations further comprise:

communicating with external self-assembling robots to coordinate movement to a selected location of the locations in the coordinate system, wherein the movement motors are controlled to move to the selected location to couple to the barrier.

12. The moveable robot block of claim 11, wherein the operations further comprise:

receiving a revised barrier plan to form a revised barrier occupying a smaller space than the barrier to reduce a size of the barrier, wherein the revised barrier plan indicates a revised coordinate system for the self-assembling robots to form the revised barrier;

determining whether the selected location is within the revised coordinate system; and decoupling from at least one adjacent self-assembling robot to separate from the barrier to form the revised barrier in response to determining that the selected location is not within the revised coordinate system.

13. The moveable robot block of claim 10, wherein the plurality of moveable robot blocks are stacked in rows to form the barrier, wherein the environmental sensor comprises a water pressure sensor to sense water pressure bearing on the moveable robot block, wherein the operations further comprise:

determining whether the sensed water pressure indicates that the moveable robot block is submerged in water, wherein the environmental condition indicates whether the moveable robot block is submerged or is not submerged in water.

14. The moveable robot block of claim 10, wherein the plurality of moveable robot blocks are stacked in rows to form the barrier, wherein the environmental sensor comprises a water pressure sensor to sense water pressure bearing on the moveable robot block, wherein the operations further comprise:

determining whether the sensed water pressure indicates that the moveable robot block is submerged in water;

determining whether a height of the moveable robot block is higher than a high water mark in response to determining that the moveable robot block is submerged in water, wherein the environmental condition is transmitted and indicates that a water level exceeds the high water mark in response to determining that the height is higher than the high water mark and the moveable robot block is submerged in water; and determining whether the height of the moveable robot block is lower than a low water mark in response to determining that the moveable robot block is not submerged in water, wherein the environmental condition is transmitted and indicates that a water level is below the low water mark in response to determining that the height is lower than the low water mark and the moveable robot block is not submerged in water.

15. The moveable robot block of claim 10, wherein the environmental sensor comprises a water sensor to sense water bearing on a surface of the moveable robot block, wherein the operations further comprise:

determining whether the water sensor senses water; and determining whether the moveable robot block located within an interior of the barrier, wherein the environmental condition is transmitted and indicates that the water is sensed in response to determining that the water sensor senses water and that the moveable robot block is determined located within the interior of the barrier.

16. A method implemented in a moveable robot block to form a barrier, comprising:

receiving a command to couple the moveable robot block to a location in a coordinate system comprising the barrier formed of a plurality of moveable robot blocks;

controlling movement motors to cause the moveable robot block to move to the location in the coordinate system to couple to the barrier according to the command;

sensing, with an environmental sensor, an environmental condition related to water sensed external to the moveable robot block when the moveable robot block is coupled to the barrier at a position in the coordinate system, the moveable robot block including the environmental sensor; and transmitting the environmental condition to the an assembly management system over a network to determine whether to adjust the barrier.

17. The method of claim 16, wherein the moveable robot block comprises a self-assembling robot implementing a self-assembly algorithm, wherein the command includes a barrier plan indicating a placement of self-assembling robots at locations in a coordinate system to form a barrier in a geographical area, wherein the coordinate system indicates locations for the self-assembling robots to form the barrier, further comprising:

communicating with external self-assembling robots to coordinate movement to a selected location of the locations in the coordinate system, wherein the movement motors are controlled to move to the selected location to couple to the barrier.

18. The method of claim 17, further comprising:

receiving a revised barrier plan to form a revised barrier occupying a smaller space than the barrier to reduce a size of the barrier, wherein the revised barrier plan indicates a revised coordinate system for the self-assembling robots to form the revised barrier;

determining whether the selected location is within the revised coordinate system; and decoupling from at least one adjacent self-assembling robot to separate from the barrier to form the revised barrier in response to determining that the selected location is not within the revised coordinate system.

19. The method of claim 16, wherein the plurality of moveable robot blocks are stacked in rows to form the barrier, wherein the environmental sensor comprises a water pressure sensor to sense water pressure bearing on the moveable robot block, further comprising:

determining whether the sensed water pressure indicates that the moveable robot block is submerged in water, wherein the environmental condition indicates whether the moveable robot block is submerged or is not submerged in water.

20. The method of claim 16, wherein the plurality of moveable robot blocks are stacked in rows to form the barrier, wherein the environmental sensor comprises a water pressure sensor to sense water pressure bearing on the moveable robot block, further comprising:

determining whether the sensed water pressure indicates that the moveable robot block is submerged in water;

determining whether a height of the moveable robot block is higher than a high water mark in response to determining that the moveable robot block is submerged in water, wherein the environmental condition is transmitted and indicates that a water level exceeds the high water mark in response to determining that the height is higher than the high water mark and the moveable robot block is submerged in water; and determining whether the height of the moveable robot block is lower than a low water mark in response to determining that the moveable robot block is not submerged in water, wherein the environmental condition is transmitted and indicates that a water level is below the low water mark in response to determining that the height is lower than the low water mark and the moveable robot block is not submerged in water.

21. The method of claim 16, wherein the environmental sensor comprises a water sensor to sense water bearing on a surface of the moveable robot block, further comprising:
    determining whether the water sensor senses water; and
    determining whether the moveable robot block located within an interior of the barrier, wherein the environmental condition is transmitted and indicates that the water is sensed in response to determining that the water sensor senses water and that the moveable robot block is determined located within the interior of the barrier.

\* \* \* \* \*